(12) United States Patent  (10) Patent No.: US 7,469,874 B2
Akahori  (45) Date of Patent: Dec. 30, 2008

(54) TUBE VALVE, A TUBE VALVE APPARATUS AND A HEAD CLEANING APPARATUS

(75) Inventor: Yutaka Akahori, Nagano-ken (JP)

(73) Assignee: Seiko Epson Corporation (JP)

( * ) Notice: Subject to any disclaimer, the term of this patent is extended or adjusted under 35 U.S.C. 154(b) by 816 days.

(21) Appl. No.: 10/844,616

(22) Filed: May 12, 2004

(65) Prior Publication Data

US 2005/0053501 A1 Mar. 10, 2005

(30) Foreign Application Priority Data

May 13, 2003 (JP) ............................. 2003-134817
Jan. 9, 2004 (JP) ............................. 2004-004125

(51) Int. Cl.
*F16K 7/04* (2006.01)

(52) U.S. Cl. ............................................. 251/7; 251/4

(58) Field of Classification Search ..................... 251/7, 251/4
See application file for complete search history.

(56) References Cited

U.S. PATENT DOCUMENTS

| 2,895,653 | A |   | 7/1959 | Giepen |
| 3,182,602 | A |   | 5/1965 | Price |
| 3,305,144 | A | * | 2/1967 | Beres et al. ............ 222/402.13 |
| 3,411,534 | A |   | 11/1968 | Rose |
| 3,951,571 | A |   | 4/1976 | Jung |
| 4,463,876 | A |   | 8/1984 | Swallert |
| 5,139,018 | A |   | 8/1992 | Brodsky et al. |

| 5,901,745 | A | 5/1999 | Buchtel |

FOREIGN PATENT DOCUMENTS

| DE | 197 45 513 | 4/1999 |
| GB | 891299 | 3/1962 |
| GB | 1012565 | 12/1965 |
| GB | 2356184 | 5/2001 |
| JP | 56-501870 | 12/1981 |
| JP | 08-028453 | 1/1996 |
| JP | 08-170590 | 7/1996 |
| JP | 08-189573 | 7/1996 |
| JP | 10-311411 | 11/1998 |
| JP | 10-318417 | 12/1998 |

(Continued)

OTHER PUBLICATIONS

Communication from European Patent Office re: corresponding application No. 04010653.6.

*Primary Examiner*—Devon Kramer
*Assistant Examiner*—Vikansha Dwivedi
(74) *Attorney, Agent, or Firm*—Harness, Dickey & Pierce, P.L.C.

(57) ABSTRACT

A tube valve 1 of the present invention includes a tube 6 defining a flow path therein through which a fluid flows, the tube 6 being arranged so that a part of the tube 6 forms at least one curved portion; and an opening/closing mechanism which closes the flow path by folding the tube 6 at the at least one curved portion and opens the flow path by releasing the fold of the tube 6. The curved portion has a bendable part (bending portion) 64 where the tube 6 can be bent, and the tube 6 is folded by bending the bendable part 64. Further, a tube valve apparatus may include the tube valve 1 of the present invention. Furthermore, a head cleaning apparatus for cleaning a head of a printer of the present invention may has one or more tube valve 1 or tube valve apparatus.

21 Claims, 27 Drawing Sheets

FOREIGN PATENT DOCUMENTS

| | | |
|---|---|---|
| JP | 11-287358 | 10/1999 |
| JP | 2000-111209 | 4/2000 |
| JP | 2001-206293 | 7/2001 |
| JP | 2001-248749 | 9/2001 |
| JP | 2002-070748 | 3/2002 |
| WO | 93-019349 | 9/1993 |

* cited by examiner

TUBE VALVE, A TUBE VALVE APPARATUS AND A HEAD CLEANING APPARATUS

TECHNICAL FIELD

The present invention is related to a tube valve, a tube valve apparatus and a head cleaning apparatus.

BACKGROUND ART

In a prior art tube valve, the tube through which a fluid flows is squashed at a predetermined place (predetermined portion) to close the flow path of the fluid (see, for example, Japanese Laid-Open Patent Application No. HEI 8-189573).

However, in the tube valve described in Japanese Laid-Open Patent Application No. HEI 8-189573, since the flow path is closed by squashing the tube, there is a disadvantage that great driving force is required and therefore the power consumption thereof is high.

Further, since the flow path is opened and closed at one place, it is difficult to accurately control the flow rate of the fluid by means of this tube valve.

SUMMARY OF THE INVENTION

It is an object of the present invention to provide a tube valve and tube valve apparatus having a simple structure that make it possible to be driven with small driving force and to reduce the power consumption of the tube valve and the tube valve apparatus, and in addition to provide a tube valve that can be made smaller and lighter.

Further, it is another object of the present invention to provide a tube valve and tube valve apparatus having a simple structure that makes it possible to easily, accurately and reliably control the flow rate of a fluid.

Furthermore, it is yet another object of the present invention to provide a head cleaning apparatus using the tube valve or tube valve apparatus mentioned above.

In order to achieve the above-mentioned object, in one aspect of the invention, the present invention is directed to a tube valve. The tube valve comprises:

a tube defining a flow path therein through which a fluid flows, the tube being arranged so that a part of the tube forms at least one curved portion; and an opening/closing mechanism which closes the flow path by folding the tube at the at least one curved portion and opens the flow path by releasing the fold of the tube.

According to the present invention, because the flow path of the fluid is closed by folding the tube, it is possible to reliably open and close the flow path with small driving force in comparison with a type of tube valve that closes the flow path by squashing the tube by means of outer force. This makes it possible to reduce power consumption thereof.

Further, because the flow path of the fluid is closed by folding the tube at the at least one curved portion of the tube, it is possible to open and close the flow path more easily and reliably.

Moreover, it is possible to realize the tube valve having a simplified structure.

In the tube valve of the present invention, it is preferable that the tube valve is constructed so that the opening/closing mechanism opens and closes the flow path at one place of the tube.

This makes it possible to simplify the structure of the tube valve of the present invention.

In the tube valve of the present invention, it is preferable that the curved portion has a bendable part where the tube can be bent, and the tube is folded by bending the bendable part.

In the tube valve of the present invention, it is preferable that the curved portion is folded into a substantial M shape by bending the bendable part.

In the tube valve of the present invention, it is preferable that the opening/closing mechanism comprises a rotating element which is rotatably provided and has a cam portion, and the rotation of the rotating element makes the cam portion thereof operate to bend the bendable part so that the tube is folded.

This makes it possible to open and close the flow path smoothly.

It is preferable that the tube valve of the present invention further comprises a guide for controlling a bending direction of the curved portion.

This makes it possible to close the flow path of the fluid by folding the tube appropriately.

It is preferable that the tube valve of the present invention further comprises a moving element having a support portion that supports the tube at the bendable part of the tube and a contact portion that makes contact with the cam portion of the rotating element;

wherein the rotation of the rotating element makes the cam portion push the contact portion of the moving element to move the moving element, whereby the movement of the moving element makes the bendable part be bent to fold the tube.

This makes it possible to close the flow path of the fluid by folding the tube appropriately. Further, it is possible to prevent a direct contact between the tube and the opening/closing mechanism, and this makes it possible to prevent damage (breakage) of the tube due to the contact with the opening/closing mechanism.

In the tube valve of the present invention, it is preferable that the at least one curved portion includes two curved portions, and the opening/closing mechanism opens and/or closes the flow path at the two curved portions of the tube wherein the tube valve is constructed so that the opening/closing operation of the opening/closing mechanism makes the flow path between the two curved portions of the tube be filled with the fluid and then makes the filled fluid be discharged outside the tube valve.

This makes it possible to quantize the flow rate of the fluid in one cycle of the tube valve, whereby the flow rate of the discharged fluid can be accurately and reliably controlled, and this makes it possible to easily, accurately and reliably discharge a predetermined amount of fluid.

Further, because the flow path of the fluid is closed by folding the tube, it is possible to reliably open and close the flow path with small driving force in comparison with a type of tube valve that closes the flow path by squashing the tube by means of outer force.

In the tube valve of the present invention, it is preferable that the tube valve is provided so that a pressure at one end of the tube is higher than a pressure at the other end of the tube, and that the tube valve is constructed so that the opening/closing operation of the opening/closing mechanism makes the flow path between the two curved portions of the tube be filled with the fluid from the one end of the tube and then makes the filled fluid be discharged outside the tube valve from the other end of the tube.

In the tube valve of the present invention, it is preferable that, when the filled fluid is discharged from the flow path between the two curved portions, the tube is folded at any one of the two curved portions by means of the opening/closing mechanism to close the flow path.

This makes it possible to prevent the fluid from leaking inside the tube and flowing out freely.

In the tube valve of the present invention, it is preferable that the one curved portion at which the tube is folded is located on the side of the one end that is under the higher pressure than the other end.

This makes it possible to prevent the fluid from leaking inside the tube and flowing out freely.

In the tube valve of the present invention, it is preferable that, when the flow path between the two curved portions is filled with the fluid, the tube is folded at any one of the two curved portions by means of the opening/closing mechanism to close the flow path.

This makes it possible to prevent the fluid from leaking inside the tube and flowing out freely, and it is possible to fill the fluid in the flow path between the two curved portions.

In the tube valve of the present invention, it is preferable that the one curved portion at which the tube is folded is located on the side of the one end that is under the lower pressure than the other end.

This makes it possible to prevent the fluid from leaking inside the tube and flowing out freely, and it is possible to fill the fluid in the flow path between the two curved portions.

In the tube valve of the present invention, it is preferable that the opening/closing mechanism always folds the tube at any one of the two curved portions to close the flow path.

This makes it possible to prevent the fluid from leaking inside the tube and flowing out freely.

It is preferable that the tube valve of the present invention further comprises adjusting means for adjusting the amount of fluid that is filled in the flow path between the two curved portions by adjusting the length of the tube between the two curved portions.

This makes it possible to freely adjust (change) the amount of fluid that is filled in the flow path between the two curved portions, namely, the amount of fluid discharged in one cycle.

In the tube valve of the present invention, it is preferable that each of the two curved portions has a bendable part where the tube can be bent, and the tube is folded by bending the bendable part.

It is preferable that the tube valve of the present invention further comprises two guides which respectively control bending directions of the tube at the two curved portions.

This makes it possible to close the flow path of the fluid by folding the tube appropriately.

In the tube valve of the present invention, it is preferable that the two guides respectively include a first moving element which is movably provided and has a support portion that supports the tube at the bendable part of one of the two curved portions and a second moving element which is movably provided and has a support portion that supports the tube at the bendable part of the other curved portion.

This makes it possible to prevent a direct contact between the tube and the opening/closing mechanism, and this makes it possible to prevent damage (breakage) of the tube due to the contact with the opening/closing mechanism.

In the tube valve of the present invention, it is preferable that the two guides respectively include a first moving element which is movably provided and has a contact portion that makes contact with the tube at one of the two curved portions and a second moving element which is movably provided and has a contact portion that makes contact with the tube at the other curved portion.

In the tube valve of the present invention, it is preferable that the opening/closing mechanism comprises a rotating element which is rotatably provided and has a cam portion, and the rotation of the rotating element makes the cam portion thereof operate to bend the bendable part so that the tube is folded.

This makes it possible to simplify the structure of the tube valve. Further, it is possible to easily, accurately and reliably control the flow rate or amount of the discharged fluid by adjusting the revolutions (number of revolutions) and the rotation speed (rotation frequency) of the rotating element.

It is preferable that the tube valve of the present invention further comprises:
  a first moving element which is movably provided and has a support portion that supports the tube at the bendable part of one of the two curved portions and a contact portion that makes contact with the cam portion of the rotating element; and
  a second moving element which is movably provided and has a support portion that supports the tube at the bendable part of the other curved portion and a contact portion that makes contact with the cam portion of the rotating element;
  wherein the rotation of the rotating element makes the cam portion push the contact portion of the first moving element, whereby the movement of the first moving element makes the corresponding bendable part be bent to fold the tube, and wherein the rotation of the rotating element makes the cam portion push the contact portion of the second moving element, whereby the movement of the second moving element makes the corresponding bendable part be bent to fold the tube.

This makes it possible to close the flow path of the fluid by folding the tube appropriately. Further, it is possible to prevent a direct contact between the tube and the opening/closing mechanism, and this makes it possible to prevent damage (breakage) of the tube due to the contact with the opening/closing mechanism.

It is preferable that the tube valve of the present invention further comprises:
  a first moving element which is movably provided and has a contact portion that makes contact with the tube at one of the two curved portions and a contact portion that makes contact with the cam portion of the rotating element; and
  a second moving element which is movably provided and has a contact portion that makes contact with the tube at the other curved portion and a contact portion that makes contact with the cam portion of the rotating element;
  wherein the rotation of the rotating element makes the cam portion push the contact portion of the first moving element, whereby the movement of the first moving element makes the tube be folded, and wherein the rotation of the rotating element makes the cam portion push the contact portion of the second moving element, whereby the movement of the second moving element makes the tube be folded.

This makes it possible to close the flow path of the fluid by folding the tube appropriately. Further, it is possible to prevent a direct contact between the tube and the opening/closing mechanism, and this makes it possible to prevent damage (breakage) of the tube due to the contact with the opening/closing mechanism.

In the tube valve of the present invention, it is preferable that the tube is restored from a bent state to a released state by means of the self-restoring force thereof to open the flow path.

This makes it possible to simplify the structure of the tube valve, and to make the tube valve lighter.

It is preferable that the tube valve of the present invention further comprises restoration assisting means for assisting the restoration of the tube.

This makes it possible to restore the tube more reliably, and this makes it possible to open the flow path of the tube.

In another aspect of the invention, the present invention is directed to a tube valve apparatus. The tube valve apparatus comprises:
- a plurality of tube valves, each tube valve comprising:
  - a tube defining a flow path through which a fluid flows; and
  - an opening/closing mechanism which closes the flow path by folding the tube and opens the flow path by releasing the fold of the tube;
- an actuator; and
- a power transmission mechanism for transmitting driving force of the actuator to each of the plurality of opening/closing mechanisms to drive the plurality of opening/closing mechanisms.

According to the present invention, because the flow path of the fluid is closed by folding the tube, it is possible to reliably open and close the flow path with small driving force in comparison with a type of tube valve that closes the flow path by squashing the tube by means of outer force. This makes it possible to reduce power consumption thereof.

Further, it is possible to open and close the plurality of flow paths, and this makes it possible to make the tube valve apparatus small and light.

Moreover, it is possible to realize the tube valve apparatus having a simplified structure.

It is preferable that the tube valve apparatus of the present invention further comprises a plurality of boards which respectively correspond to the plurality of tubes, each of the tubes having a foldable part where the tube can be folded, each of the boards having a major surface, and the plurality of boards being arranged so that the major surfaces of the boards are substantially parallel to each other;
- wherein the tubes are respectively provided in the boards so that the foldable part of each of the tubes is positioned on the corresponding board.

This makes it possible to make the tube valve apparatus more compact.

In the tube valve apparatus of the present invention, it is preferable that the number of the actuator provided in the power transmission mechanism is one.

This makes it possible to make the tube valve apparatus further small and light.

In the tube valve apparatus of the present invention, it is preferable that each of the tubes is arranged so that a part of the tube forms at least one curved portion, and the tube valve is constructed so that the tube is folded at the at least one curved portion thereof to close the corresponding flow path.

This makes it possible to open and close the flow path more easily and reliably.

In the tube valve apparatus of the present invention, it is preferable that the tube valve apparatus is constructed to be capable of selectively opening or closing the flow path or flow paths of one predetermined tube or two or more predetermined tubes among the plurality of tubes.

In this way, the tube valve apparatus can freely take (select) a state where only the flow path of the predetermined (specific) tube is opened or a state where only the flow path of the predetermined (specific) tube is closed.

In the tube valve apparatus of the present invention, it is preferable that the tube valve apparatus has two modes including a first mode in which the opening/closing mechanism can selectively open and/or close the flow path or flow paths of one predetermined tube or two or more predetermined tubes among the plurality of tubes, and a second mode in which the opening/closing mechanism can open and/or close the flow paths of all of the plurality of tubes.

This makes it possible to enhance versatility of the tube valve apparatus.

In the tube valve apparatus of the present invention, it is preferable that the curved portion of each tube has a bendable part where the tube can be bent, and the tube is folded by bending the bendable part.

In the tube valve apparatus of the present invention, it is preferable that the opening/closing mechanism of each of the tube valves comprises a rotating element which is rotatably provided and has a cam portion, and the rotation of the rotating element of each opening/closing mechanism makes the cam portion thereof operate to bend the bendable part so that the tube is folded.

This makes it possible to open and close the flow path smoothly.

In the tube valve apparatus of the present invention, it is preferable that rotation axes of the rotating elements substantially correspond with each other.

This makes it possible to further simplify the structure of the tube valve apparatus.

In the tube valve apparatus of the present invention, it is preferable that each of the tube valves has a guide which controls bending direction of the curved portion thereof.

This makes it possible to close the flow path of the fluid by folding the tube appropriately.

In the tube valve apparatus of the present invention, it is preferable that each of the tube valves comprises a moving element which is rotatably provided and has a support portion that supports the corresponding tube at the bendable part of the tube and a contact portion that makes contact with the cam portion of the corresponding rotating element;
- wherein the rotation of the rotating element makes the cam portion thereof push the contact portion of the corresponding moving element to move the moving element, whereby the movement of the moving element makes the bendable part be bent to fold the tube.

This makes it possible to prevent a direct contact between the tube and the opening/closing mechanism, and this makes it possible to prevent damage (breakage) of the tube due to the contact with the opening/closing mechanism.

In the tube valve apparatus of the present invention, it is preferable that the tube of each tube valve is restored from a bent state to a released state by means of the self-restoring force thereof to open the flow path.

This makes it possible to simplify the structure of the tube valve, and to make the tube valve lighter.

In the tube valve apparatus of the present invention, it is preferable that each of the tube valves comprises restoration assisting means for assisting the restoration of the tube.

This makes it possible to restore the tube more reliably, and this makes it possible to open the flow path of the tube.

In yet another aspect of the present invention, the present invention is directed to a head cleaning apparatus for cleaning a head of a printer. The head of the printer has a nozzle. The head cleaning apparatus of one embodiment comprises:
- a receiving portion for receiving an ink to be discharged from the nozzle of the head, the receiving portion being removably attached to the head when the head is to be cleaned;
- a pump which sucks the ink from the head via the nozzle of the head and the receiving portion;
- a flow path provided between the pump and the receiving portion; and a tube valve provided on the flow path, the tube valve comprising:
  a tube constituted from a part of the flow path therein through which the ink flows, the tube being arranged so that a part of the tube forms at least one curved portion; and
  an opening/closing mechanism which closes the flow path by folding the tube at the at least one curved portion and opens the flow path by releasing the fold of the tube.

In another embodiment of a head cleaning apparatus for cleaning a head of a printer, the head of the printer has a plurality of nozzles. The head cleaning apparatus comprises:
  a plurality of receiving portions each receiving an ink to be discharged from each of the plurality of nozzles, the plurality of receiving portions being removably attached to the head when the head is to be cleaned;
  a pump which sucks the ink from the head via each of the nozzles of the head and each of the receiving portions;
  a plurality of flow paths which are respectively provided between the pump and the plurality of receiving portions; and
  a tube valve apparatus comprising:
    a plurality of tube valves, each tube valve comprising:
      a tube constituted from a part of the flow path therein through which the ink flows; and
      an opening/closing mechanism which closes the flow path by folding the tube and opens the flow path by releasing the fold of the tube;
    an actuator; and
    a power transmission mechanism for transmitting driving force of the actuator to each of the plurality of opening/closing mechanisms to drive the plurality of opening/closing mechanisms.

This makes it possible to make the pump smaller, and therefore it is possible to reduce the power consumption of the pump and to make the whole head cleaning apparatus smaller. In addition, it is possible to reduce the amount of wasted ink (vain ink).

BRIEF DESCRIPTION OF THE DRAWINGS

The preferred embodiments of a tube valve, a tube valve apparatus and a head cleaning apparatus are described below with reference to the appended drawings.

PREFERRED EMBODIMENTS OF THE INVENTION

The preferred embodiments of a tube valve, a tube valve apparatus and a head cleaning apparatus of the present invention are described in detail below with reference to the appended drawings.

First Embodiment

Figure 1:
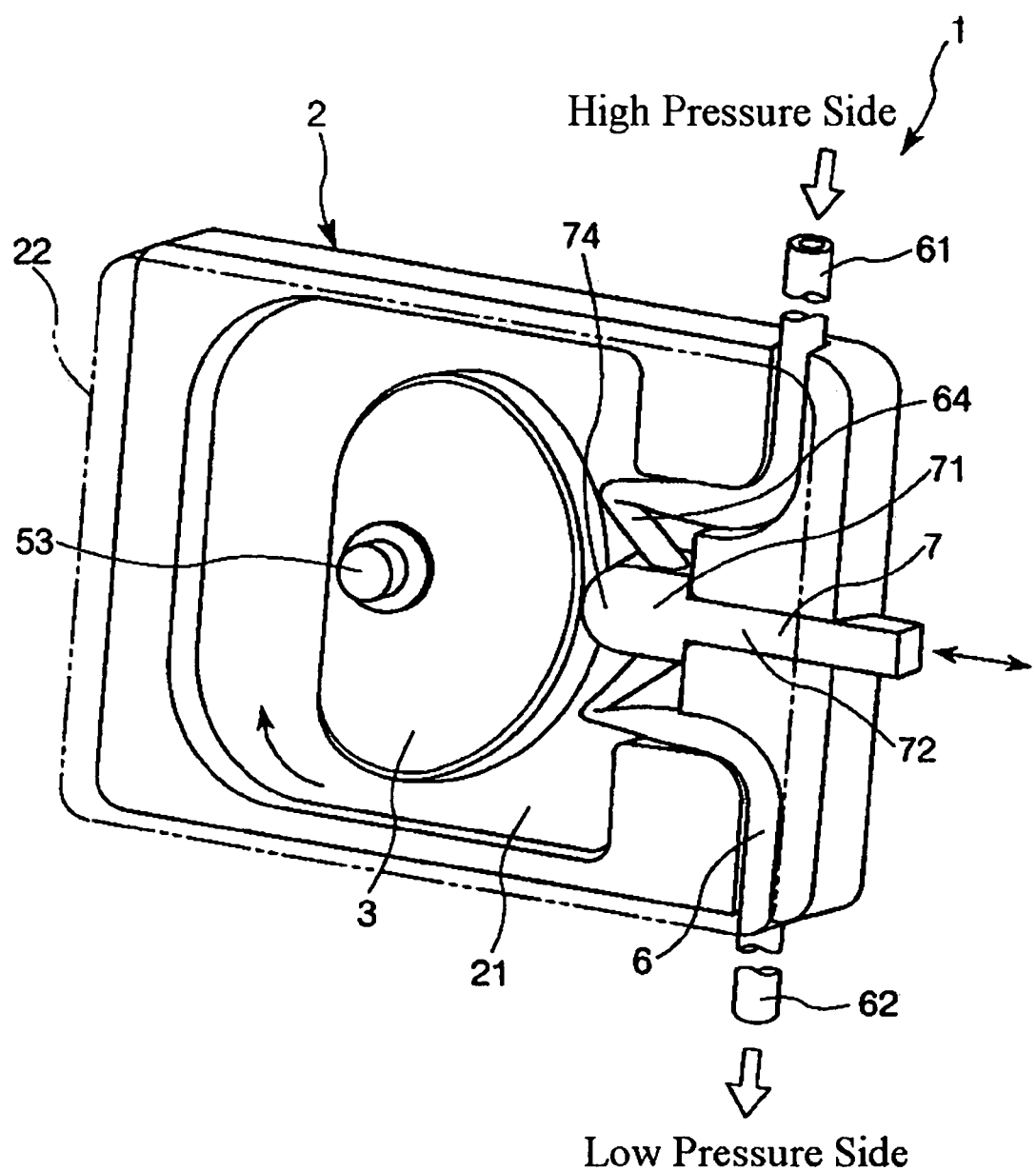
FIG. 1 is a perspective view showing a tube valve in a first embodiment according to the present invention.
Figure 2:
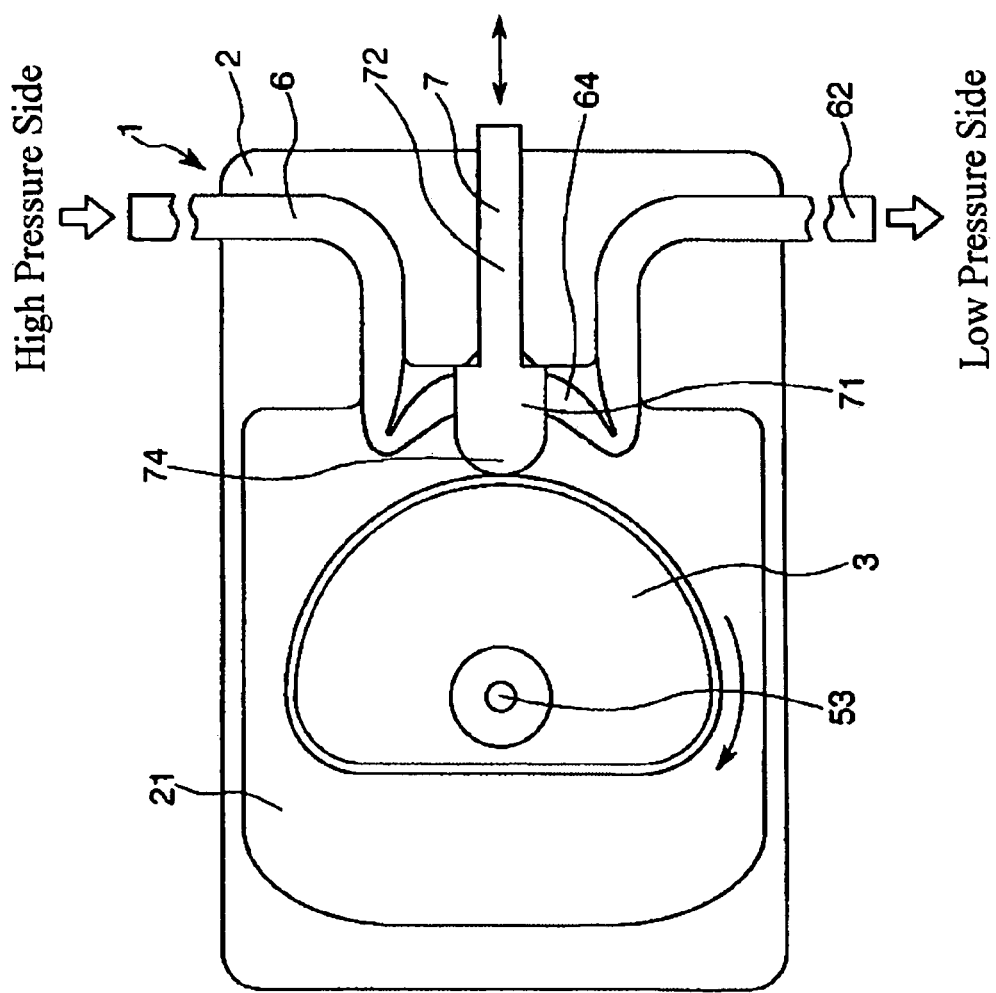
FIG. 2 is a plan view of the tube valve shown in FIG. 1.
Figure 3:
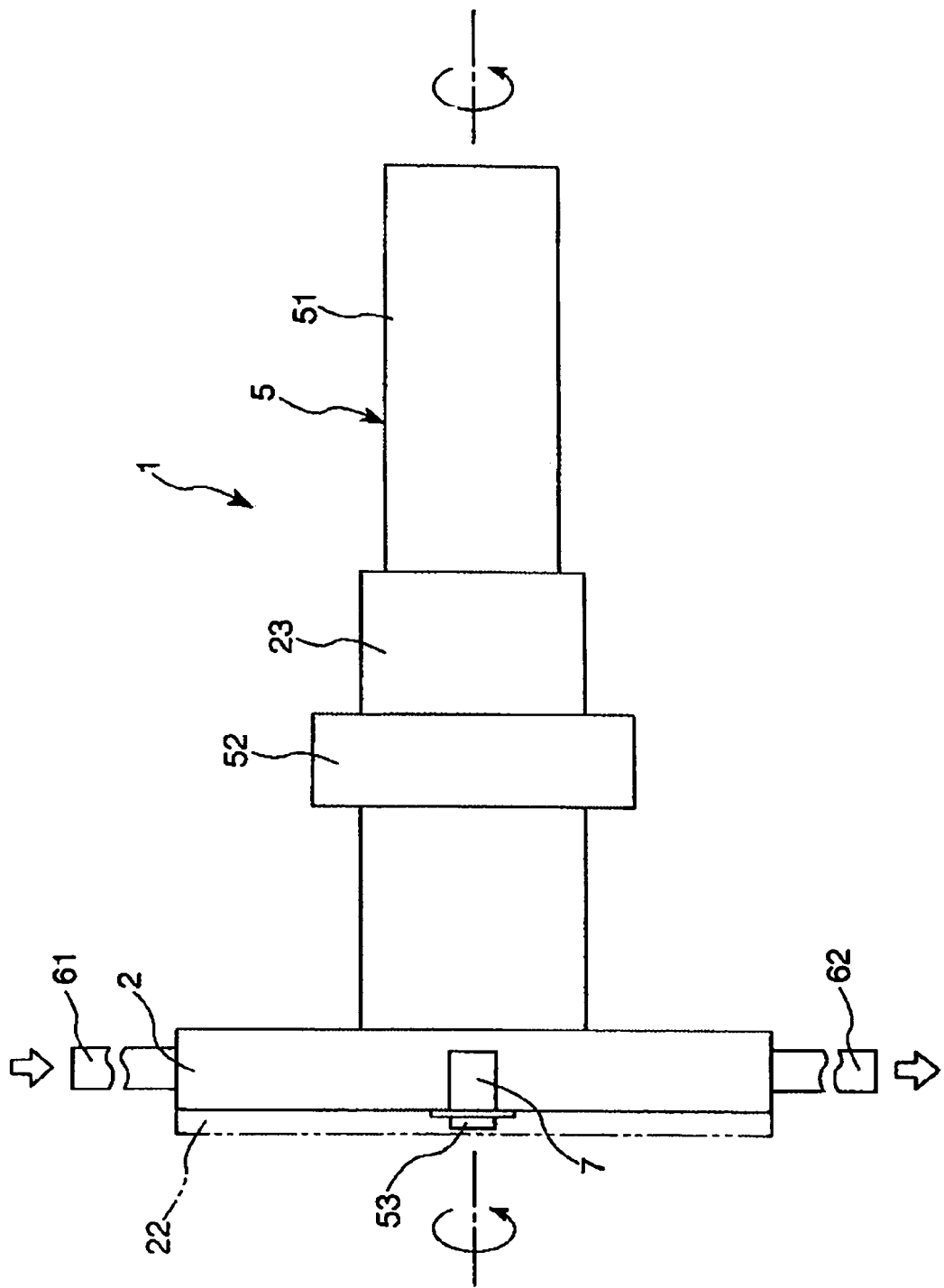
FIG. 3 is a side view (right side view) of the tube valve shown in FIG. 1.

FIG. 1 is a perspective view showing a tube valve of a first embodiment according to the present invention. FIG. 2 is a plan view of the tube valve shown in FIG. 1. FIG. 3 is a side view (right side view) of the tube valve shown in FIG. 1.

A tube valve 1 shown in these drawings has a special feature in the point that a flow path of a fluid is constituted from the internal cavity of a tube (tubular member) 6 and the flow path of the fluid is closed (shut) by folding the tube 6 at one place (point) thereof (i.e., one curved portion) and opened by releasing the fold of the tube 6, that is, by unfolding the tube 6 at the one place (point) thereof. Namely, a portion (opening/closing portion) where the flow path inside the tube 6 is opened and closed is provided at one place in the tube valve 1, and by bending the opening/closing portion, namely, a bendable part (bending portion 64) of the tube 6, the tube 6 is folded to close the flow path, and then the fold of the tube 6 is released to open (reopen) the flow path. Hereinafter, a description thereof is given with reference to the drawings.

As shown in FIGS. 1-3, the tube valve 1 includes a flexible (restorable) tube 6, a frame (board) 2, a rotating element (rotor) 3, a motor serving as a driving source (actuator) 5, and a guide serving as a moving element (guide means) 7. In this case, the rotor 3 and the motor 5 form the main portion of an opening/closing mechanism that closes the flow path by folding the tube 6, and opens the flow path by releasing the fold of the tube 6.

The frame 2 is constructed from a plate-shaped member which forms a substantial rectangle when viewed from a top of the frame 2. The frame 2 includes a concave portion 21 having a predetermined shape in the flat portion thereof in the left side in FIG. 3. The rotor 3, the tube 6 and the guide 7 are housed in this concave portion 21, and these are arranged substantially in the same plane. In this way, the relative position relationship and displacing direction of the rotor 3, the tube 6 and the guide 7 are controlled.

Further, in a state in which the rotor 3, the tube 6 and the guide 7 are housed inside the concave portion 21, a cover 22 is attached to the frame 2 from the left side in FIG. 3. In this way, the rotor 3, the tube 6 and the guide 7 are held inside the concave portion 21 and prevented from protruding out.

Moreover, a tubular portion 23 is provided on the frame 2 at the right side in FIG. 3. The motor 5 is housed inside this tubular portion 23.

In this regard, there is no particular limitation to the construction material of the frame 2, but various resin materials are preferred. By using a resin material, it becomes possible to construct a lightweight frame 2 (i.e., it is possible to make the frame 2 light).

The rotor 3 is a plane cam, and is constructed by a disc member having a substantially semicircular shape when viewed from a top of the tube valve 1 shown in FIG. 2. The outer peripheral portion of the rotor 3 is a cam portion, namely, the outer peripheral surface forms a cam surface. The rotor 3 is housed inside the concave portion 21 of the frame 2 in a manner that enables the rotor 3 to rotate substantially parallel with respect to the frame 2.

Further, the rotor 3 is fixed to a shaft portion 53 of the motor 5, and driving force (torque) is applied to the rotor 3 from the motor 5 via this shaft portion 53. In this way, when the rotor 3 is rotated with respect to the shaft portion 53 serving as a rotation axis, the outer peripheral surface (cam surface) thereof operates the guide 7, whereby the guide 7 undergoes periodic motion (reciprocating motion) in accordance with the peripheral surface shape (the shape of the cam surface) of the rotor 3. In this way, the bendable part of the tube 6 is bent, and the bending of the tube 6 is removed (i.e., the tube 6 is restored). In this regard, the relationship with the fold of the tube 6 when the rotor 3 is rotated is described later.

Moreover, the outer peripheral surface of the rotor 3 is formed as a smooth surface. Namely, the angular portions of the semicircular shape are rounded. In this way, when the tube valve 1 is driven (operated), the outer peripheral surface of the rotor 3 is prevented from catching the guide 7, and this makes it possible to drive the tube valve 1 more smoothly.

The phase (rotation angle) of the rotor 3 is controlled by controlling the driving of the motor 5.

In this regard, there is no particular limitation to the construction material of the rotor 3, but various resin materials are preferred. By using a resin material, it becomes possible to construct a lightweight rotor 3.

The tip of the motor 5 is inserted into the tubular portion 23 of the frame 2, and the motor 5 is fixed to the frame 2 by fastening a fixing ring 52 from the outer periphery of the tubular portion 23 to a main portion 51 of the motor 5. Further, the shaft portion 53 of the motor 5 is inserted through the frame 2, and the rotor 3 is fixed to the tip of the shaft portion 53 (see FIGS. 1 and 3). In this way, the motor 5 rotates the rotor 3 from the right side of the frame 2 in FIG. 3.

It is preferable that, for example, a stepping motor, a DC motor with an encoder or the like is used as for the motor 5.

This makes it possible to easily and reliably carry out the control of the phase (rotation angle) of the rotor 3.

Further, it is preferable that a motor with a decelerator having a planetary gear or the like is used as the motor 5. This makes it possible to rotate the motor 5 at a low speed without providing additional decelerator, and to obtain high torque.

In this case, other types of motors may be used as the motor 5, and other types of actuators may be used in place of the motor 5.

The tube 6 is a tubular member having flexibility that makes it possible to easily fold the tube 6 by external force, and restorability that restores the tube 6 to its original shape when such external force is removed. Namely, the tube 6 can be easily folded by force (load) from a direction (radial direction) substantially perpendicular to the longitudinal direction thereof, and the tube 6 can be restored to its original shape when such force is removed.

The internal cavity of the tube 6 forms a flow path through which a fluid flows. In this regard, there is no particular limitation to the flowing fluid, and various gases, various liquids or the like may be used, for example.

Further, when the tube 6 is folded (when the amount of folding reaches a predetermined amount), the flow path is closed, and when the fold of the tube 6 is removed (when the tube 6 is restored to its original shape), the flow path is opened.

In this regard, the restoring force of the tube 6 becomes larger as the pressure inside the flow path becomes higher.

There is no particular limitation to the construction material of the tube 6, and various rubber materials such as silicone rubber, various thermoplastic elastomers and the like, and various resin materials may be used, for example. Among these materials, elastic materials such as the various rubber materials and the various thermoplastic elastomers and the like are preferred from the point of having superior foldability and restorability.

Further, in the example shown in the drawings, one end portion 61 of the tube 6 is connected to a high pressure side, and the other end portion 62 is connected to a low pressure side. It the case where the flow path of the tube 6 is opened, the fluid flows through the inside of the tube 6 from the end portion 61 side (high pressure side) to the end portion 62 side (low pressure side). Alternatively, the one end portion 61 of the tube 6 may be connected to the low pressure side, and the other end portion 62 may be connected to the high pressure side.

Moreover, the tube 6 is housed (provided) inside the concave portion 21 of the frame 2 so that the one end thereof is positioned at the upper side in FIG. 2 (i.e., the one end portion protrudes from the upper side in FIG. 2) and the other end thereof is positioned at the lower side in FIG. 2 (i.e., the other end portion protrudes from the lower side in FIG. 2). In this case, the tube 6 is arranged at the right side of the frame 2 in FIG. 2, namely, at the right side of the rotor 3 in FIG. 2.

A bending portion (bendable part) 64 that is bent in a substantial U shape is established at one place in the tube 6 (see FIG. 5), and by bending the bending portion 64 of the tube 6, the tube 6 is folded to close the flow path, and the fold of the tube 6 is released to open the flow path.

In this regard, the tube 6 is arranged so that the bending portion 64 is positioned (overlapped) on the rotation path of the outer peripheral surface of the rotor 3.

When the rotor 3 is rotated, the tube 6 is squeezed by external force received from the outer peripheral surface of the protruding side (the side having the semicircular-shaped arc) of the rotor 3 via the guide 7 described later, whereby substantial M-shaped fold is formed at the bending portion 64

(see FIG. 2). In this way, the flow path is closed at the bending portion 64. In this case, the folded points are formed at two places in the upper and lower sides of the guide 7 in FIG. 2, but at least one folded point makes the flow path close. Further, the flow path may be closed at the two folded points simultaneously. Moreover, the tube valve 1 may be constructed so that one folded point is formed by bending the bending portion 64 instead of the M-shaped folded point.

Figure 5:
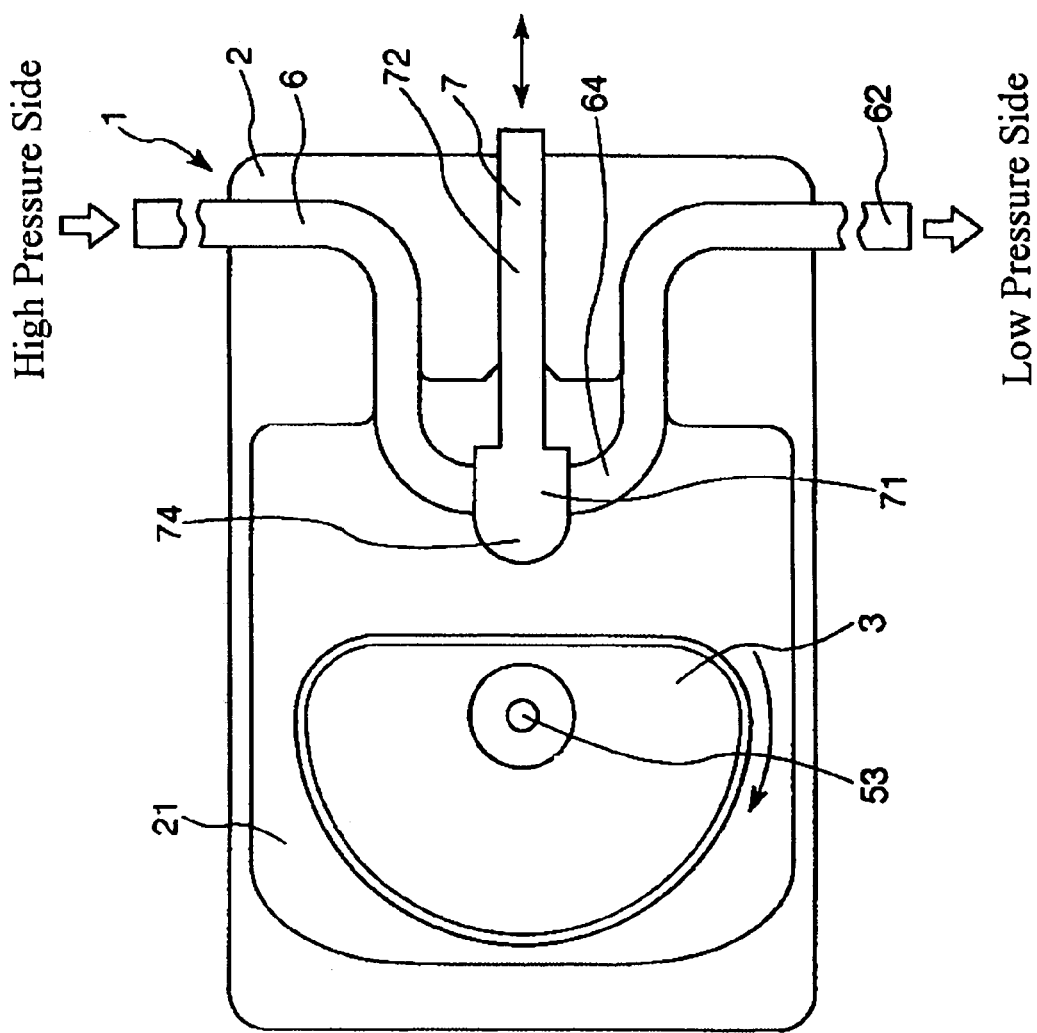
FIG. 5 is a plan view of the tube valve 1 shown in FIG. 1.

Further, when the rotor 3 is rotated so that the outer peripheral surface of the flat side thereof (the side that does not have the semicircular arc) is moved to a predetermined position, the external force from the rotor 3 is removed, and the tube 6 is restored by the self-restoring force (elastic force), whereby the flow path is opened (see FIG. 5).

In this way, the tube 6 can become the bent and released states of the tube 6, namely, the closing and opening states of the flow path by receiving the external force from the outer peripheral surface of the rotor 3 at the bending portion 64 by means of the rotation of the rotor 3. Further, it is possible to maintain (hold) that state (the closing state of the flow path or the opening state of the flow path) by stopping the rotor 3 at a predetermined phase (predetermined position).

Further, the tube 6 is held (supported) and guided by the guide 7 serving as a moving element at the bending portion 64.

The guide 7 is formed to have an overall substantial T shape, and includes a tubular holding portion (support portion) 71, and a rod-shaped sliding portion 72 provided substantially perpendicular to the holding portion 71. The tube 6 is inserted through the holding portion 71 of the guide 7, and is held (supported) by means of the holding portion 71.

Further, a convex portion (contact portion) 74 having a tip surface that is curved in a substantially arc shape is formed at the rotor 3 side of the holding portion 71. The convex portion 74 abuts on (makes contact with) the outer peripheral portion (cam portion) of the rotor 3, namely, the outer peripheral surface (cam surface). In this way, a necessary and sufficient space (i.e., clearance) is formed between the tube 6 and the outer peripheral surface of the rotor 3, and this prevents the rotor 3 from touching the tube 6. Accordingly, it is possible to more reliably prevent the tube 6 from being damaged by contact with the rotor 3 when the tube valve 1 is driven.

Further, the guide 7 is housed in the concave portion 21 of the frame 2. The concave portion 21 of the frame 2 is formed to have a groove shape that corresponds to the sliding portion 72 of the guide 7 at the portion where the sliding portion 72 is arranged (housed), and the groove restricts the sliding direction (moving direction) of the sliding portion 72. The guide 7 slides along the groove in the concave portion 21 in a radial direction of the rotor 3 with respect to the frame 2. Namely, when the tube valve 1 is driven, the periodic rotational motion of the rotor 3 is converted to a linear motion of the guide 7 in the radial direction of the rotor 3 by means of the outer peripheral surface of the rotor 3, the guide 7 and the groove of the concave portion 21.

This guide 7 undergoes a linearly reciprocating motion inside the flat surface of the frame 2 to control the bending direction of the tube 6 so that the bending portion 64 of the tube 6 is reliably bent into a substantial M shape to close the flow path and then restored to open the flow path. This makes it possible to open and close the flow path inside the tube 6 reliably.

In this regard, there is no particular limitation to the construction material of the guide 7, but various resin materials are preferred. By using a resin material, it becomes possible to construct a lightweight guide 7.

Next, the operation of the tube valve 1 will be described.

Figure 4:
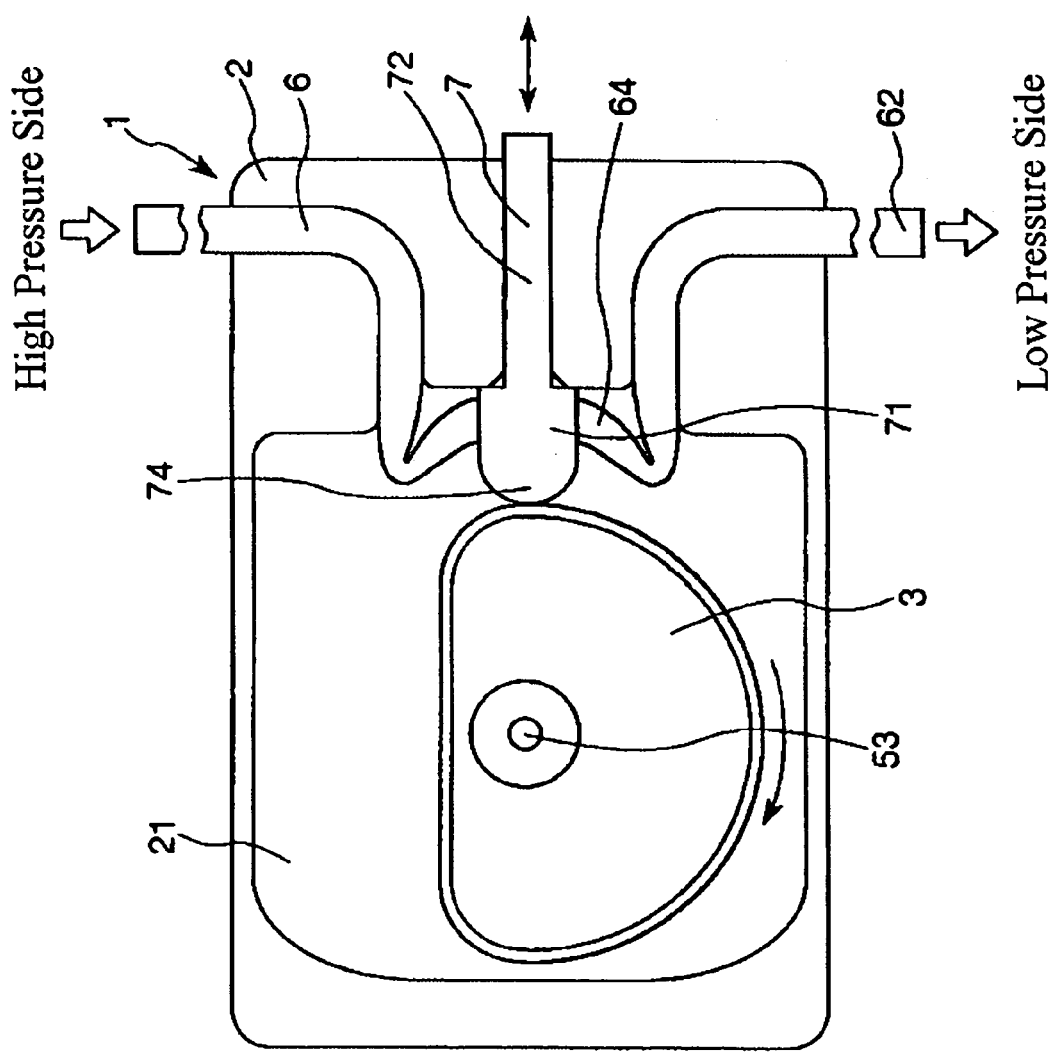
FIG. 4 is a plan view of the tube valve 1 shown in FIG. 1.
Figure 6:
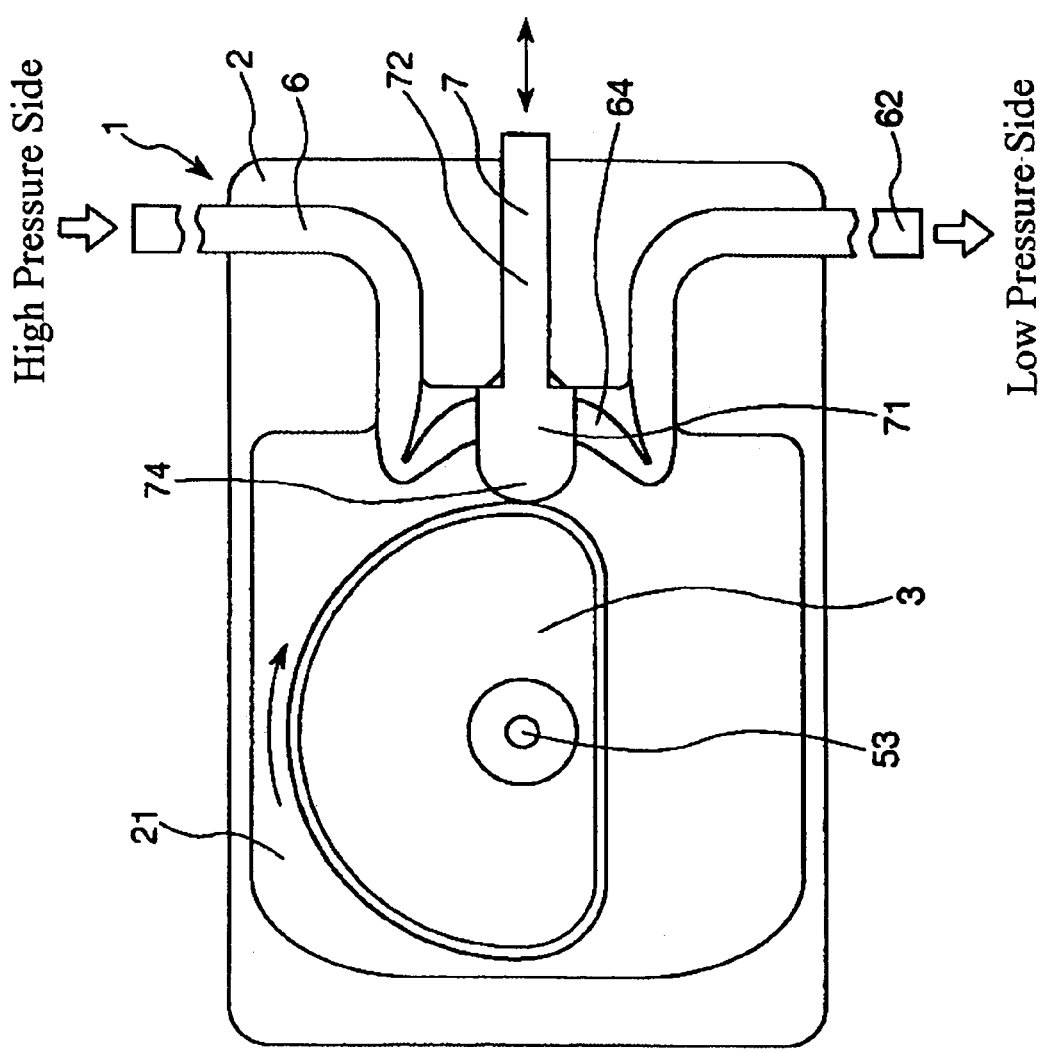
FIG. 6 is a plan view of the tube valve 1 shown in FIG. 1.

FIGS. 4-6 are plan views of the tube valve 1 shown in FIG. 1. With the tube valve 1 shown in FIG. 2 representing the initial state, FIGS. 4-6 respectively show the state where the rotor 3 is rotated 90 degrees (FIG. 4), the state where the rotor 3 is rotated 180 degrees (FIG. 5), and the state where the rotor 3 is rotated 270 degrees (FIG. 6) in the clockwise direction from the initial state.

When the tube valve 1 is driven, the motor 5 is driven to rotate the rotor 3 in the clockwise direction in the drawings. Further, the driving control of the tube valve 1 is carried out by controlling the driving of the motor 5.

In this tube valve 1, in the initial state shown in FIG. 2, the protruding side (the side having the semicircular-shaped arc) of the rotor 3 faces the bending portion 64 of the tube 6, and the flat side (the side that does not have the semicircular arc) of the rotor 3 faces the side opposite to the bending portion 64 of the tube 6.

In this state, the tube 6 is bent in a substantial M shape at the bending portion 64, and therefore the tube 6 is folded at the folded points, thereby closing the flow path.

Next, when the rotor 3 is rotated 90 degrees in the clockwise direction as shown in FIG. 4, the bending portion 64 is maintained in a bent state, and the flow path is maintained in a closing state.

Next, when the rotor 3 is rotated another 90 degrees in the clockwise direction as shown in FIG. 5 (i.e., 180 degrees from the initial state shown in FIG. 2), the rotor 3 removes the bend of the bending portion 64. Namely, because the flat side of the rotor 3 faces the bending portion 64 of the tube 6, the pushing force applied from the rotor 3 to the guide 7 is removed, and the bending portion 64 is restored by the self-restoring force, whereby the flow path at the bending portion 64 is opened.

In this way, the fluid at the high pressure side flows in the flow path in the tube 6 from the high pressure side end portion 61 toward the low pressure side, and is discharged from the low pressure side end portion 62 to the outside of the tube valve 1.

Next, when the rotor 3 is rotated another 90 degrees in the clockwise direction as shown in FIG. 6 (i.e., 270 degrees from the initial state shown in FIG. 2), the rotor 3 bends the bending portion 64 in a substantial M shape. In this way, the tube 6 is folded at the bending portions 64, thereby closing the flow path.

Next, when the rotor 3 is rotated another 90 degrees in the clockwise direction as shown in FIG. 2 (one revolution from the initial state shown in FIG. 2), the rotor 3 returns to the initial state shown in FIG. 2. Namely, the state where the bending portion 64 is bent (i.e., the tube 6 is folded at the bending portion 64) and the flow path is closed is maintained.

In this way, in the tube valve 1, by rotating the rotor 3, the bending portion 64 of the tube 6 can be bent to fold the tube 6 at the folded points so that the flow path is closed and the bend of the tube 6 can be removed to release the fold of the tube 6 so that the flow path is opened. Namely, the tube valve 1 can become both a state where the bending portion 64 of the tube 6 is bent and a state where the bend of the tube 6 is restored, namely, a state where the flow path is closed and a state where the flow path is opened. Further, by stopping the rotor 3 at a predetermined phase (predetermined position), it is possible to hold (maintain) any one of the states (the state where the flow path is closed or the state where the flow path is opened).

As described above, because the flow path of the fluid is closed by folding the tube 6, the tube valve 1 can reliably open and close the flow path with small driving force compared with a type of tube valve that closes the flow path by squashing the tube 6 with external force.

Further, compared with a prior art electromagnetic valve or a type of tube valve that closes the flow path by squashing the tube 6, the tube valve 1 has an advantage of requiring only a small amount of energy (consumed power) for driving.

Moreover, in the tube valve 1, by stopping the rotor 3, it is possible to hold either the state where the flow path is closed or the state where the flow path is opened. Because an electric power is required only when the state of the tube valve 1 is changed from the state where the flow path is closed to the state where the flow path is opened or changed from the state where the flow path is opened to the state where the flow path is closed by rotating the rotor 3, it is possible to further reduce the consumed power.

Further, in the tube valve 1, because the flow path of the fluid is closed by folding the tube 6 at the bending portion 64 of the tube 6, it is possible to easily and reliably fold the tube 6 and to release (remove) the fold of the tube 6 (i.e., it is possible to open and close the flow path).

Moreover, in the tube valve 1, because the flow path is opened and closed at one place of the tube 6 using a single rotor 3 with a cam portion, the number of parts (components) can be reduced, the structure can be simplified, there is an advantage in miniaturization, and it is possible to easily and reliably control opening and closing of the flow path.

In addition, the tube valve 1 can be made further lightweight by forming all parts excluding the motor 5 from a resin material.

Further, in the tube valve 1, the arrangement of the tube 6 is simple. Namely, because such arrangement can be completed by housing the tube 6 inside the frame 2 without cutting, and then attaching the cover 22, there is an advantage that the tube valve 1 can be provided later for an existing tube 6.

Second Embodiment

Next, a tube valve in a second embodiment according to the present invention will be described.

Figure 7:
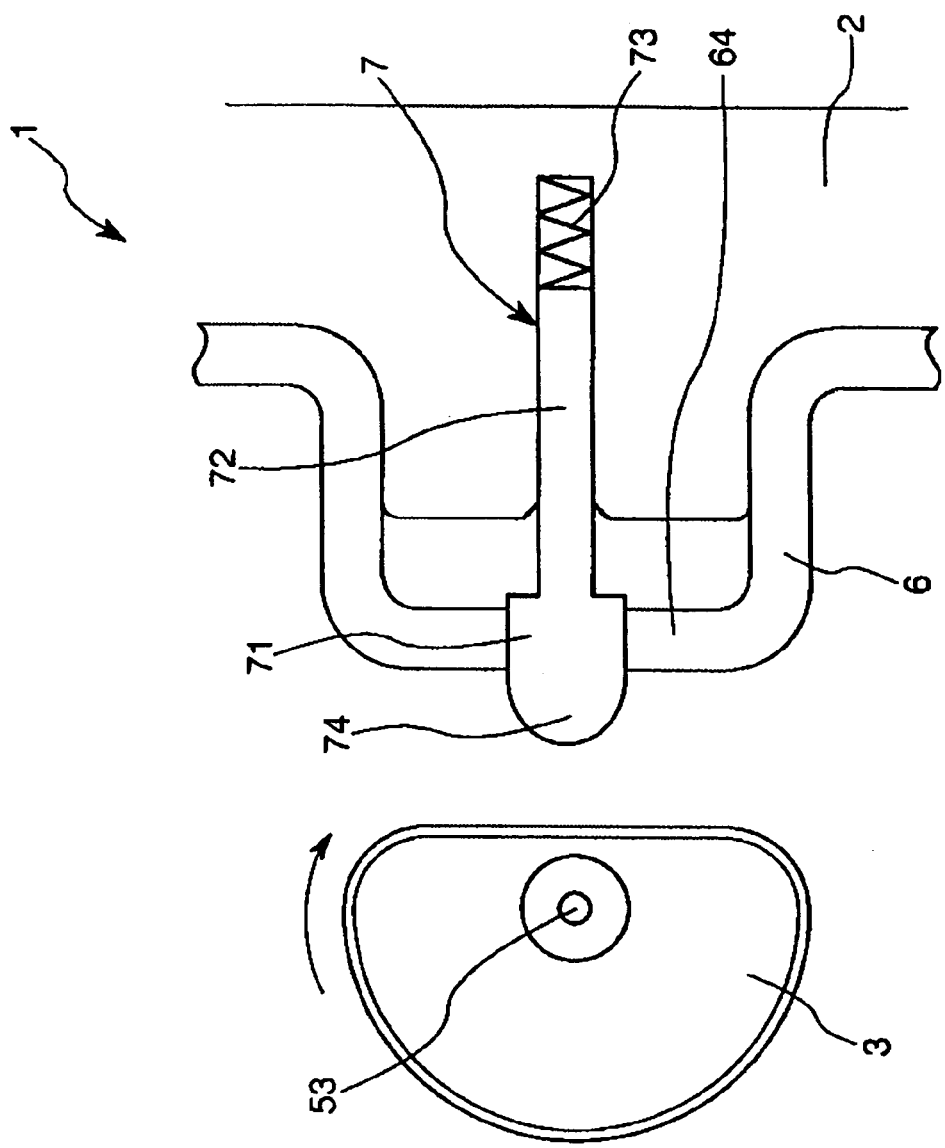
FIG. 7 is a plan view showing a tube valve in a second embodiment according to the present invention.

FIG. 7 is a plan view showing a tube valve in a second embodiment according to the present invention.

In the description of the tube valve 1 of the second embodiment given below, the focus of the description is on the different points between the first embodiment described above and the second embodiment, and a description of the same parts is omitted.

As shown in FIG. 7, the tube valve 1 of the second embodiment has the special feature of including restoration assisting means which assists the restoration of the tube 6. Namely, the tube valve 1 includes a spring (elastic member) 73 provided at the end portion of the sliding portion 72 of the guide 7 as the restoration assisting means. In this regard, the restoration assisting means is not limited to the spring 73.

The spring 73 is provided in a slightly constricted state, and biases the guide 7 toward the rotor 3 side (the left side in FIG. 7) by means of its restoring force.

In this tube valve 1, when the guide 7 is pushed by the rotor 3 to bend the tube 6 in a substantial M shape at the bending portion 64, the spring 73 is further constricted. Then, when the rotor 3 is rotated as shown in FIG. 7, the restoring force of the tube 6 and the restoring force (elastic force) of the spring 73 push the guide 7 to the left side in FIG. 7, whereby the bend of the bending portion 64 is restored (i.e., the fold of the tube 6 is released) and therefore the flow path of the bending portion 64 is opened.

In this way, the tube valve 1 makes it possible to more reliably restore the tube 6 and therefore open the flow path by the operation of the spring 73.

Further, according to this tube valve 1, it is possible to obtain the effects similar to those of the first embodiment described above.

The constitution of the present embodiment can be applied to each of the embodiments after a fourth embodiment described later.

Third Embodiment

Next, a tube valve in a third embodiment according to the present invention will be described.

Figure 8:
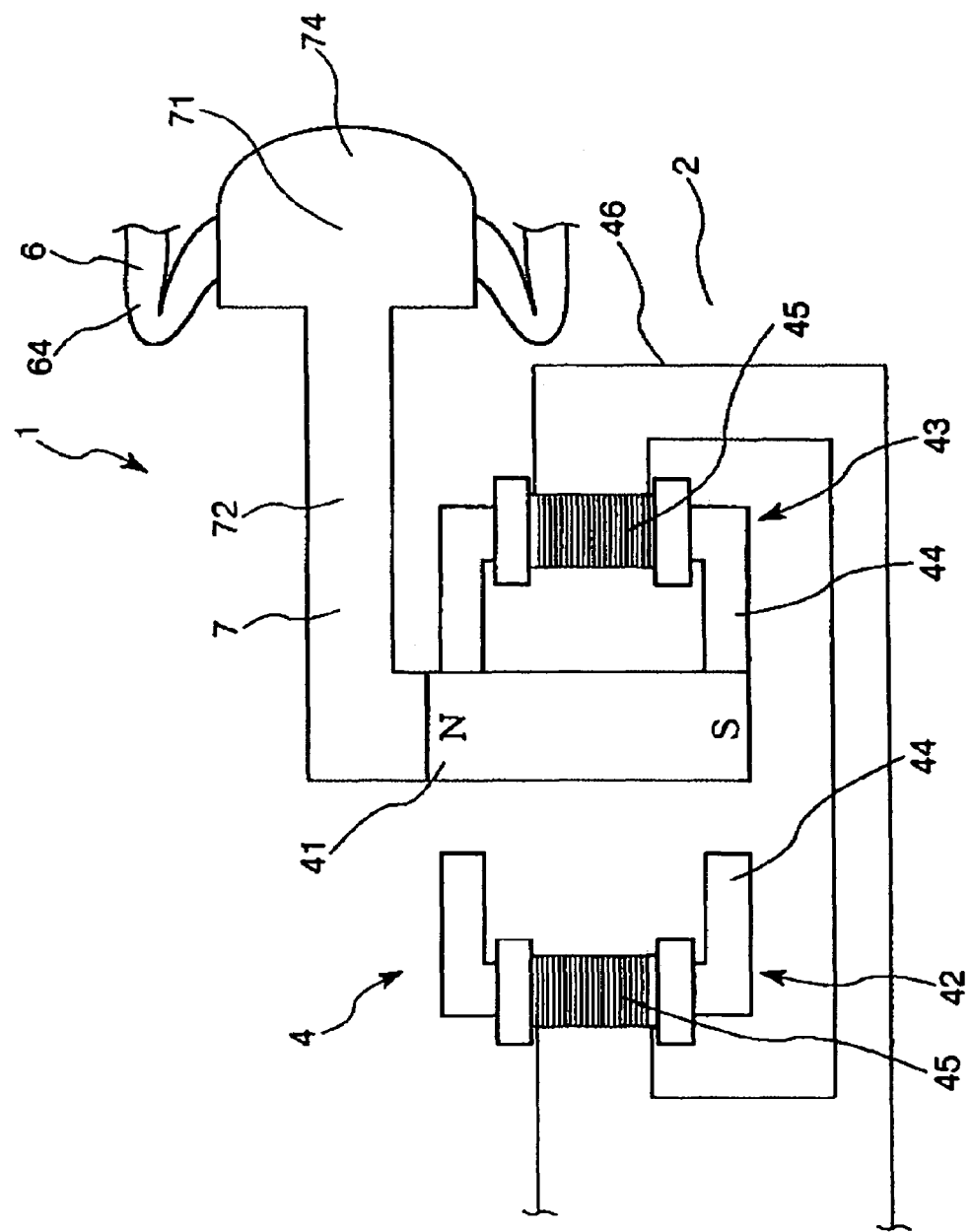
FIG. 8 is a plan view showing a tube valve in a third embodiment according to the present invention.

FIG. 8 is a plan view showing a tube valve in a third embodiment according to the present invention.

In the description of the tube valve 1 of the third embodiment given below, the focus of the description is on the different points between the first embodiment described above and the third embodiment, and a description of the same parts is omitted.

As shown in FIG. 8, the tube valve 1 of the third embodiment has a specific feature in the point that an electromagnetic actuator 4 which moves the guide 7 is provided as an actuator of the opening/closing mechanism.

The actuator 4 includes a permanent magnet 41, and a pair of electromagnets 42, 43 provided at the both sides of the permanent magnet 41 with respect to the permanent magnet 41.

The permanent magnet 41 has a rod-shaped structure, and magnetized so that one end thereof (the upper side in FIG. 8) becomes a north pole and the other end thereof (the lower side in FIG. 8) becomes a south pole. Further, the one end of the permanent magnet 41 is fixed to a base (i.e., the end opposite to the holding portion 71) of the sliding portion 72 of the guide 7.

The electromagnets 42, 43 are fixedly provided on the frame 2. The electromagnet 42 is positioned at the left side of the permanent magnet 41 in FIG. 8, while the electromagnet 43 is positioned at the right side of the permanent magnet 41 in FIG. 8.

Each of the electromagnets 42, 43 includes an iron core 44 having a substantial U-shape structure, and a coil 45 wound around the iron core 44. The iron cores 44 of the electromagnets 42, 43 are provided so that the edge surfaces of the iron cores 44 of the electromagnets 42, 43 face to each other.

The coil 45 of the electromagnet 42 and the coil 45 of the electromagnet 43 are constructed from a piece of winding 46, and are respectively wound around the iron cores 44 of the electromagnets 42, 43 in mutually opposite directions. For that reason, when an electric current is applied to the coils 45 of the electromagnets 42, 43 via the winding 46, the iron cores 44 of the electromagnets 42, 43 are respectively magnetized so that the poles thereof are different from each other.

Namely, when an electric current is applied to the winding 46 in a predetermined direction by a conducting circuit (not shown), the electric current flows through the coils 45 of the electromagnets 42, 43 in the predetermined direction, whereby the iron core 44 of the electromagnet 42 is magnetized so that one end thereof (upper side in FIG. 8) becomes a south pole and the other end thereof (lower side in FIG. 8) becomes a north pole, on the contrary the iron core 44 of the electromagnet 43 is magnetized so that one end thereof (upper side in FIG. 8) becomes a north pole and the other end thereof (lower side in FIG. 8) becomes a south pole.

On the other hand, when an electric current is applied to the winding 46 in the reverse direction by the conducting circuit (not shown), the electric current flows through the coils 45 of the electromagnets 42, 43 in the reverse direction, whereby the iron core 44 of the electromagnet 42 is magnetized so that one end thereof (upper side in FIG. 8) becomes a north pole and the other end thereof (lower side in FIG. 8) becomes a south pole, on the contrary the iron core 44 of the electromagnet 43 is magnetized so that one end thereof (upper side in FIG. 8) becomes a south pole and the other end thereof (lower side in FIG. 8) becomes a north pole.

Next, an operation of the tube valve 1 will be described.

At a state where an electric current is not conducted to the winding 46, the permanent magnet 41 is attracted to the iron core 44 of either the electromagnet 42 or 43 due to its magnetic force.

FIG. 8 shows that the permanent magnet 41 is attracted to the iron core 44 of the electromagnet 43 due to its magnetic force. At this state, the tube 6 is bent at the bending portion 64 thereof to be fold in a substantial M shape, thereby closing the flow path of the tube 6.

Next, when an electric current is applied to the winding 46 in a predetermined direction, the electric current flows through the coils 45 of the electromagnets 42, 43 in the predetermined direction, whereby the iron core 44 of the electromagnet 42 is magnetized so that one end thereof (upper side in FIG. 8) becomes a south pole and the other end thereof (lower side in FIG. 8) becomes a north pole, on the contrary the iron core 44 of the electromagnet 43 is magnetized so that one end thereof (upper side in FIG. 8) becomes a north pole and the other end thereof (lower side in FIG. 8) becomes a south pole.

In this way, the permanent magnet 41 receives attracting force from the iron core 44 of the electromagnet 42 and repelling force from the iron core 44 of the electromagnet 43 to be moved toward the electromagnet 42 side, whereby the permanent magnet 41 is attracted to the iron core 44 of the electromagnet 42 due to its magnetic force. At this time, because the guide 7 is moved toward the electromagnet 42 side together with the permanent magnet 41, the bend of the bending portion 64 is restored (i.e., the fold of the tube 6 is released), thereby opening the flow path of the tube 6.

Then, even though the application of the electric current to the winding 46 is stopped, the permanent magnet 41 remains being attracted to the iron core 44 of the electromagnet 42 due to its magnetic force. Thus, the state where the bend of the bending portion 64 is restored (i.e., the fold of the tube 6 is released) is held and therefore the flow path of the tube 6 is opened is maintained. Accordingly, it is possible to reduce the power consumption of the tube valve 1.

Next, when an electric current is applied to the winding 46 in the reverse direction by the conducting circuit (not shown), the electric current flows through the coils 45 of the electromagnets 42, 43 in the reverse direction, whereby the iron core 44 of the electromagnet 42 is magnetized so that one end thereof (upper side in FIG. 8) becomes a north pole and the other end thereof (lower side in FIG. 8) becomes a south pole, on the contrary the iron core 44 of the electromagnet 43 is magnetized so that one end thereof (upper side in FIG. 8) becomes a south pole and the other end thereof (lower side in FIG. 8) becomes a north pole.

In this way, the permanent magnet 41 receives attracting force from the iron core 44 of the electromagnet 43 and repelling force from the iron core 44 of the electromagnet 42 to be moved toward the electromagnet 43 side, whereby the permanent magnet 41 is attracted to the iron core 44 of the electromagnet 43 due to its magnetic force. At this time, because the guide 7 is moved toward the electromagnet 43 side together with the permanent magnet 41, the tube 6 is bent at the bending portion 64 to fold the tube 6, thereby closing the flow path of the tube 6.

Then, if the application of the electric current to the winding 46 is stopped, the permanent magnet 41 remains being attracted to the iron core 44 of the electromagnet 43 due to its magnetic force. Thus, the state where the tube 6 is bent at the bending portion 64 to fold the tube 6 is held and therefore the flow path of the tube 6 is closed is maintained. Accordingly, it is possible to reduce the power consumption of the tube valve 1.

Further, according to this tube valve 1, it is possible to obtain the effects similar to those of the first embodiment described above.

Fourth Embodiment

Next, a tube valve (tube valve apparatus) in a fourth embodiment according to the present invention will be described.

Figure 9:
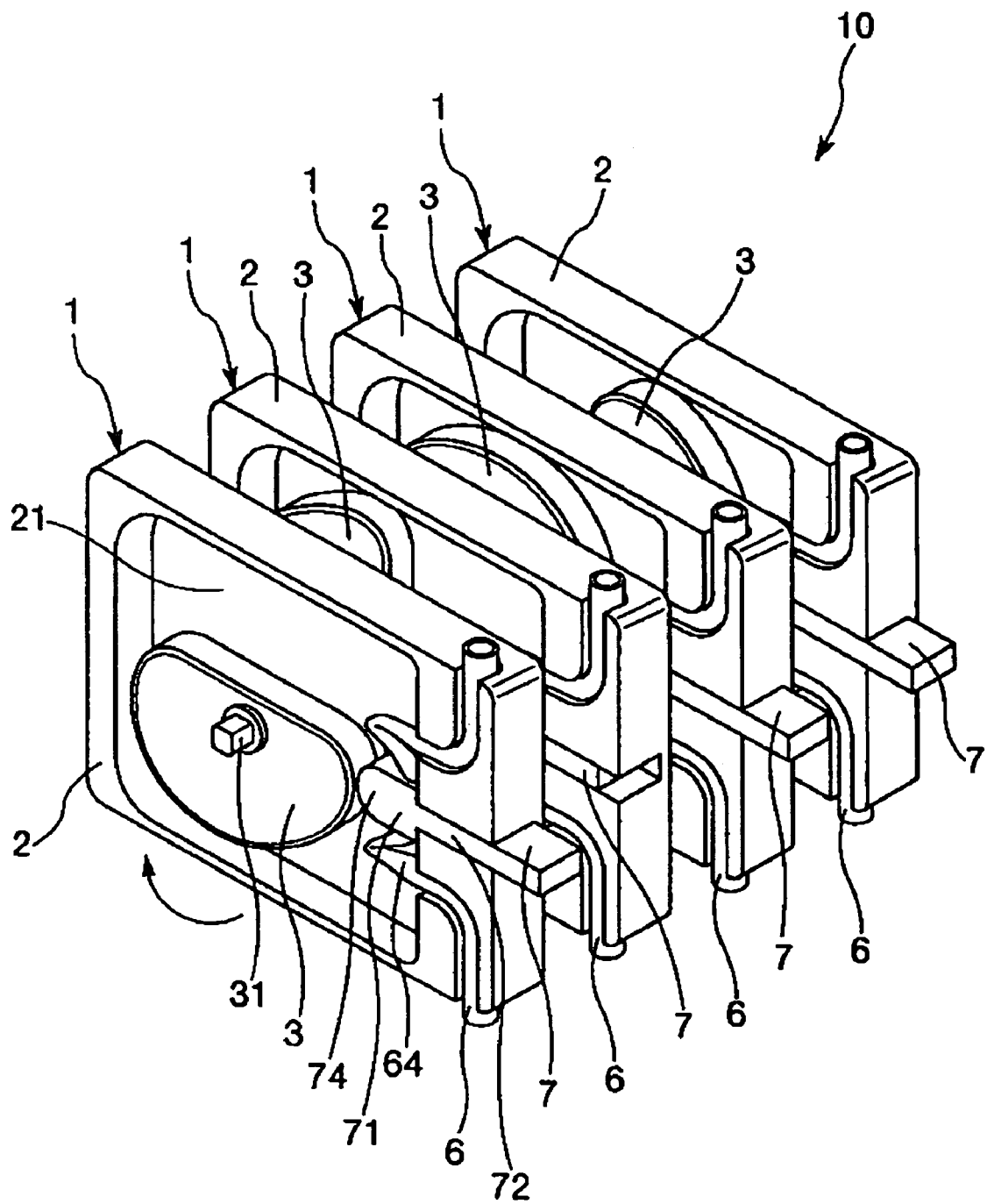
FIG. 9 is a perspective view showing a tube valve apparatus including the tube valves in a fourth embodiment according to the present invention.
Figure 10:
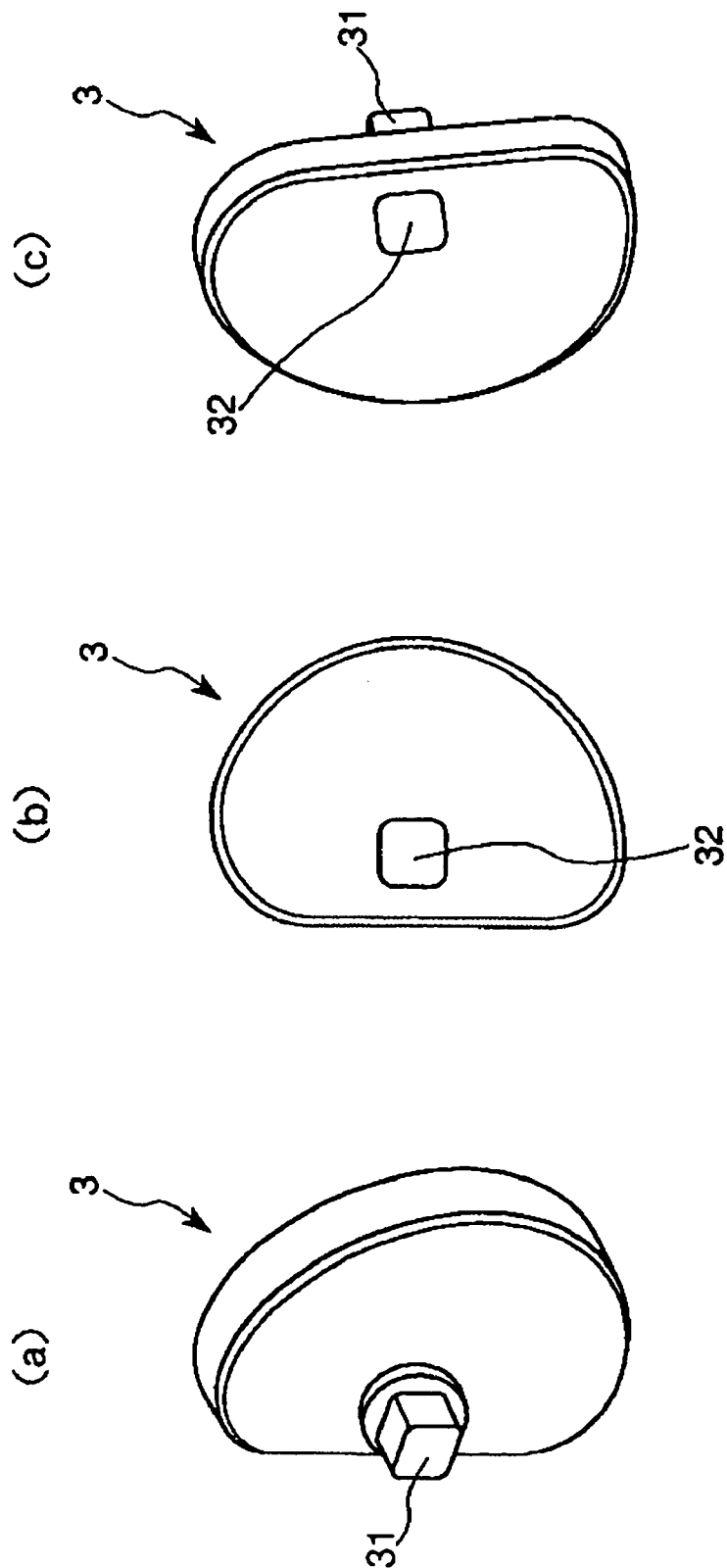
FIG. 10 is perspective views and a plan view showing the rotor of each tube valve in the tube valve apparatus shown in FIG. 9.

FIG. 9 is a perspective view showing a tube valve apparatus including the tube valves in a fourth embodiment according to the present invention. FIG. 10 is perspective views and a plan view showing the rotor of each tube valve in the tube valve apparatus shown in FIG. 9. In this case, FIGS. 10(a), 10(b) and 10(c) respectively show a perspective view of the rotor when viewed from the back side of the rotor, a plan view of the rotor, and a perspective view of the rotor when viewed from the front side of the rotor.

In the description of the tube valve apparatus 10 of the fourth embodiment given below, the focus of the description is on the different points between the first embodiment described above and the fourth embodiment, and a description of the same parts is omitted.

As shown in these drawings, the tube valve apparatus 10 of the fourth embodiment includes four tube valves (tube valve units) 1, namely, four tubes 6 and four opening/closing mechanisms each of which closes the flow path of the corresponding tube 6 by folding the corresponding tube 6 and opens the flow path by releasing the fold of the tube 6. Further, the tube valve apparatus 10 also includes a single motor 5 (actuator), and a power transmission mechanism for transmitting driving force of the motor 5 to each of the four opening/closing mechanisms to drive the four opening/closing mechanisms.

Namely, as shown in FIG. 9, the tube valve apparatus 10 of the fourth embodiment has the single motor 5 and the four tube valve units 1.

In this regard, a basic structure of the tube valve unit 1 is substantially similar to the tube valve 1 of the first embodiment described above except for a rotor 3 and the motor 5.

As shown in FIG. 10, a shaft 31 having a substantial square shape when viewed from a side of the rotor 3 is formed at a position corresponding to a shaft 53 of the motor 5 on one face of the rotor 3 in the tube valve unit 1, while a concave portion 32 having a substantial square shape when viewed from a side of the rotor 3 is formed at a position corresponding to the shaft 31 on the other face of the rotor 3. A size of the concave portion 32 is arranged to be slightly larger than a size of the shaft 31 so that the shaft 31 of another rotor 3 can be inserted into the concave portion 32. Further, the shaft 31 and the concave portion 32 are formed so that the angular portions of the shafts 31 and concave portions 32 substantially correspond with each other.

As shown in FIG. 9, the tube valve units 1 are arranged (and fixed) so that major surfaces of frames (boards) 2 of the tube valve units 1 are substantially parallel to each other and the angular portions of the frames 2 substantially correspond with each other. In this case, the frames 2 of the tube valve units 1 are arranged in a spaced manner at a predetermined interval in FIG. 9. However, the present invention is not limited to this arrangement. For example, the frames 2 of the tube valve units 1 may be arranged in close contact with each other. By arranging the frames 2 in a spaced manner or in close contact with each other, it is possible to make the tube valve apparatus 10 compact.

Further, the shaft 31 of each of the rotors 3 is inserted into the concave portion 32 of the adjacent rotor 3 to engage with this concave portion 32. A shaft substantially similar to the shaft 31 is fixed on the tip of the shaft portion 53 of the motor 5, and is inserted into the concave portion 32 of the rotor 3 in the rightmost (or inmost) tube valve unit 1 in FIG. 9 to engage with (or be fixed to) the concave portion 32. In this way, the central axes of the rotation of the rotors 3 substantially correspond with each other.

Moreover, the rotors 3 of the tube valve units 1 are provided so that a phase of a predetermined rotor 3 in the rotors 3 is different from a phase of any one rotor 3 in the other rotors 3.

Namely, in the state shown in FIG. 9, the rotor 3 of the leftmost (or hithermost) tube valve unit 1 in FIG. 9 is provided at a posture shown in FIG. 4, and the rotor 3 of the second tube valve unit 1 from the left in FIG. 9 is provided at a posture shown in FIG. 5. Further, the rotor 3 of the third tube valve unit 1 from the left in FIG. 9 is provided at a posture shown in FIG. 6, and the rotor 3 of the rightmost tube valve unit 1 in FIG. 9 is provided at a posture shown in FIG. 2.

The driving force (rotational force) from the motor 5 is applied to each of the rotors 3 via the shaft provided on the tip of the shaft portion 53 in the motor 5 and/or the shafts 31 of the rotors 3. Namely, by the driving of the motor 5, the rotors 3 are rotated together at a state where the phase differences as described above are held.

In this regard, the rotor 3 constitutes a main portion of the opening/closing mechanism in the corresponding tube valve unit 1, and the shafts 31 and the concave portions 32 of the rotors 3 constitute a main portion of the power transmission mechanism.

In the tube valve apparatus 10, it is possible to selectively restore the bent state of the bending portion 64 of only one predetermined tube 6 in the four tubes 6 to open the flow path thereof. In other words, in the tube valve apparatus 10, it is possible to selectively bend the bending portions 64 of three predetermined tubes 6 in the four tubes 6 to close the flow paths thereof.

Namely, in the state shown in FIG. 9, only the flow path of the tube 6 in the second tube valve unit 1 from the left in FIG. 9 is opened, and all of the flow paths of the tubes 6 in the other three tube valve units 1 are closed.

Next, when the rotors 3 are rotated 90 degrees in the clockwise direction, the flow path of the tube 6 in the second tube valve unit 1 from the left in FIG. 9 is closed, and the flow path of the tube 6 in the leftmost tube valve unit 1 is opened.

Next, when the rotors 3 are rotated another 90 degrees in the clockwise direction, only the flow path of the tube 6 in the rightmost tube valve unit 1 in FIG. 9 is opened, and all of the flow paths of the tubes 6 in the other three tube valve units 1 are closed.

Next, when the rotors 3 are rotated another 90 degrees in the clockwise direction, only the flow path of the tube 6 in the third tube valve unit 1 from the left in FIG. 9 is opened, and all of the flow paths of the tubes 6 in the other three tube valve units 1 are closed.

According to this tube valve apparatus 10, it is possible to obtain the effects similar to those of the first embodiment described above.

Further, in the tube valve apparatus 1, it is possible for the driving of the single motor 5 to rotate the rotors 3 of the four tube valve units 1 together, whereby it is possible to achieve the states of the tubes 6 in the tube valve units 1 where the flow path of only one predetermined tube 6 in the four tubes 6 is opened and the other three tubes 6 are closed.

In particular, in the case where a stepping motor, a DC motor with a encoder or the like which can confirm the phase (rotation angle) of the rotor 3 is used as the motor 5, it is possible to reliably open only the flow path of the tube 6 in the desired tube valve unit 1.

Further, it is possible to make the tube valve apparatus 10 small and light.

In this case, in the present embodiment, the tube valve apparatus 10 is constructed so that only flow path of one predetermined tube 6 can be selectively opened or the flow paths of three predetermined tube 6 can be selectively closed. However, the present invention is not limited to this structure. For example, the tube valve apparatus 10 may be constructed so that the flow paths of two or more predetermined tubes 6 can be selectively opened.

Alternatively, in the present invention, the tube valve apparatus 1 may be constructed so that the flow paths of the tubes 6 in all of the tube valve units 1 are opened or closed simultaneously.

Further, in the present invention, the number of the tube valve unit 1 (i.e., the tubes 6) is not limited to four, and it may be two, three, or five or more.

Moreover, in the present invention, it is possible to adjust the number of the rotors 3 (i.e., the tube valve units 1) to be worked together by adjusting the angle of a regular polygon of each of the shafts 31 and the concave portions 32. For example, in the case of four tube valve units 1, the shaft 31 and concave portion 32 of each rotor 3 may have a quadrangular shape when viewed from a top of the rotor 3, or in the case of three tube valve units 1, the shaft 31 and concave portion 32 of each rotor 3 may have a triangular shape when viewed from a top of the rotor 3.

Further, in the present invention, it is possible to add another phase to close all of the tubes 6 in the tube valve units 1 by making the structure of the shaft 31 and concave portion 32 of each of the four rotors 3 a regular pentagon when viewed from the top of each rotor 3, for example.

Moreover, in the present invention, by using a dodecagonal shaft 31, for example, it is possible to select the number of rotors 3 to be worked together from two, three, four, six or twelve when the tube valve apparatus 10 is assembled.

In addition, in the present invention, it is possible to work all of a plurality of tube valve units 1 together by setting the phases of the rotors 3 in the plurality of tube valve units 1 to the same.

Example of Application of Tube Valve or Tube Valve Apparatus

Next, as an example of application of the tube valve or tube valve apparatus, a case where the tube valve (or tube valve apparatus) of the present invention is applied to a valve or valves of a head cleaning apparatus for cleaning a head of a printer such as an ink jet printer (inkjet type printer), for example, will be described. Namely, an embodiment of the head cleaning apparatus equipped with the tube valve or tube valve apparatus of the present invention will be described.

Figure 11:
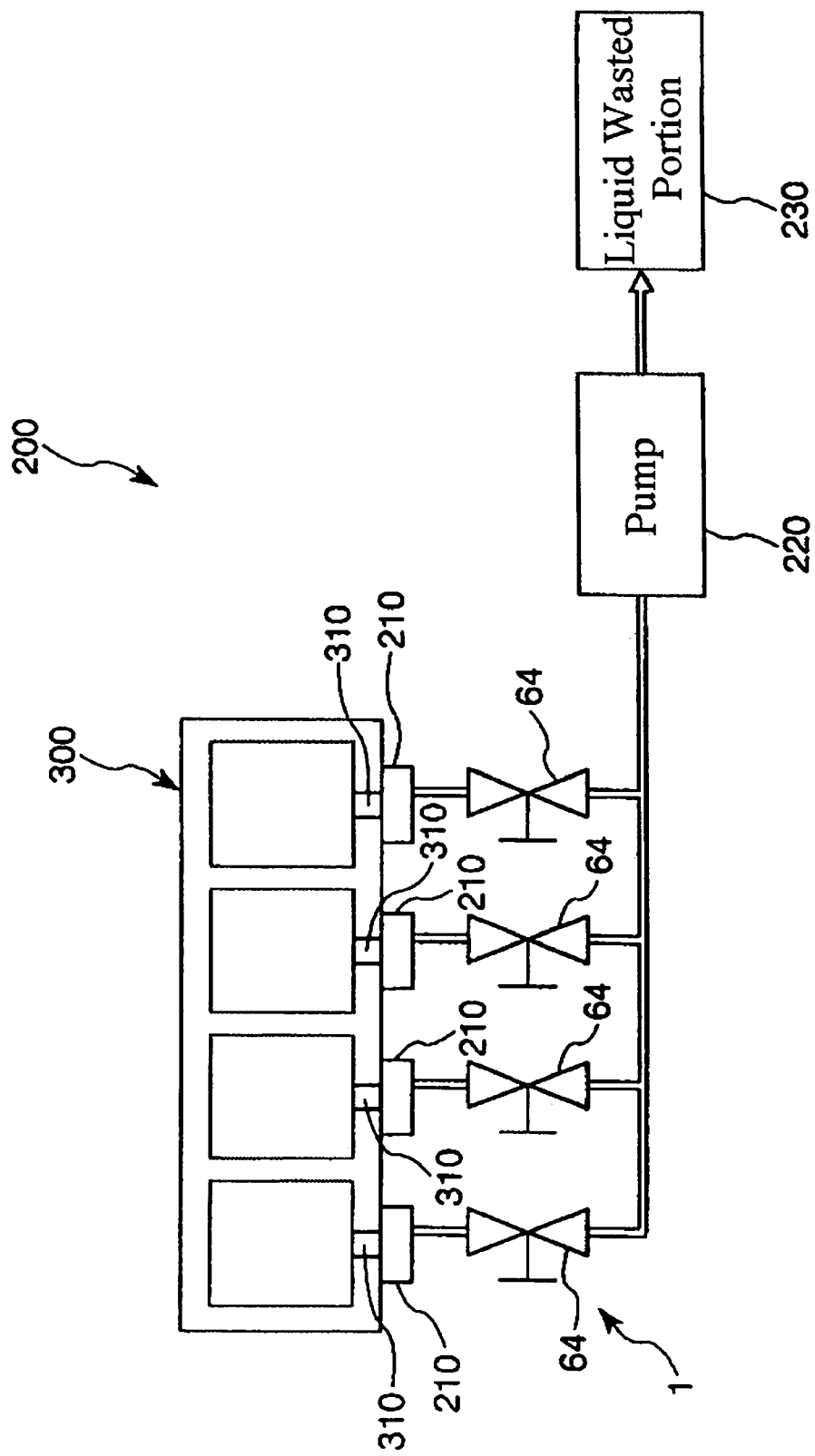
FIG. 11 is a schematic diagram showing a head cleaning apparatus equipped with the tube valve apparatus shown in FIG. 9 in an embodiment.

FIG. 11 is a schematic diagram showing a head cleaning apparatus equipped with the tube valve apparatus shown in FIG. 9 in an embodiment.

As shown in FIG. 11, a head cleaning apparatus 200 includes four receiving portions 210 each having a cap shape, a pump 220, a liquid wasted portion 230, and the tube valve apparatus 10 (or four tube valve units 1) in the fourth embodiment shown in FIG. 9 (described above) respectively provided on a line (flow path) between the pump 220 and each of the receiving portions 210.

When a head 300 of the printer 200 is to be cleaned, each of the receiving portions 210 is removably attached to the head 300 to receive an ink to be discharged from a corresponding nozzle 310 of the head 300.

One ends of the tubes 6 of the tube valve units 1 are respectively connected to the receiving portions 210, and the other ends thereof are respectively connected to the flow paths provided at the side of the pump 220.

The pump 220 sucks the ink from the head via each of the nozzles 310 of the head 300 and each of the receiving portions 210 to clean the head 300. This suction process (pumping process) makes it possible to resolve blockage of the ink in the head 300 or the like, for example. A tube pump or the like can be used as the pump 220, for example.

The ink sucked by the pump 220 is discharged (drained) from the receiving portions 210 to the liquid wasted portion 230 via the flow paths in the tubes 6 of the tube valve units 1 and the subsequent flow paths of the tube valve units 1.

In the case where there is no valve between the head 300 (i.e., each of the receiving portions 210) and the pump 220, the tube pump (pump 220) tends to be made larger with the head 300 made larger. Thus, the volume of the tube to be sucked by the tube pump becomes large, whereby the power consumption of the tube pump is increased. In addition, since, when blockage of the ink in the head 300 occurs, the tube pump sucks the ink via all of the nozzles 310 of the head 300 simultaneously to discharge the sucked ink, wasted ink (vain ink) is increased.

According to the head cleaning apparatus 200 of the present invention, in the case where the tube valve apparatus 10 (or tube valve units 1) in which the phase of each of the rotors 3 in the tube valve units 1 can be distinguished is used and only the nozzle 310 of the head 300 to discharge a predetermined colored ink is blocked, it is possible to clean the head 300 by opening only the flow path of the tube 6 in the tube valve unit 1 corresponding to the nozzle 310 to discharge the predetermined colored ink.

This makes it possible to make the pump 220 smaller, and to reduce the power consumption of the pump 220. In addition, it is possible to reduce the amount of wasted ink (vain ink).

Further, in the case where the tube valve apparatus 10 (or tube valve units 1) in which the phase of each of the rotors 3 in the tube valve units 1 cannot be distinguished is used, it is possible to reduce the load to the pump 220 by rotating the rotors 3 of the tube valve units 1 while driving the pump 220 to open the flow path of each of the tubes 6 in turn.

This makes it possible to make the pump 220 smaller, and to reduce the power consumption of the pump 220. Therefore, it is possible to make the whole head cleaning apparatus smaller.

In this regard, although the case where the tube valve apparatus 10 of the fourth embodiment is applied to the valve of the head cleaning apparatus is described, it is possible to apply the tube valve 1 described in the other embodiments to the valve of the head cleaning apparatus.

Fifth Embodiment

Next, a tube valve in a fifth embodiment according to the present invention will be described.

Figure 12:
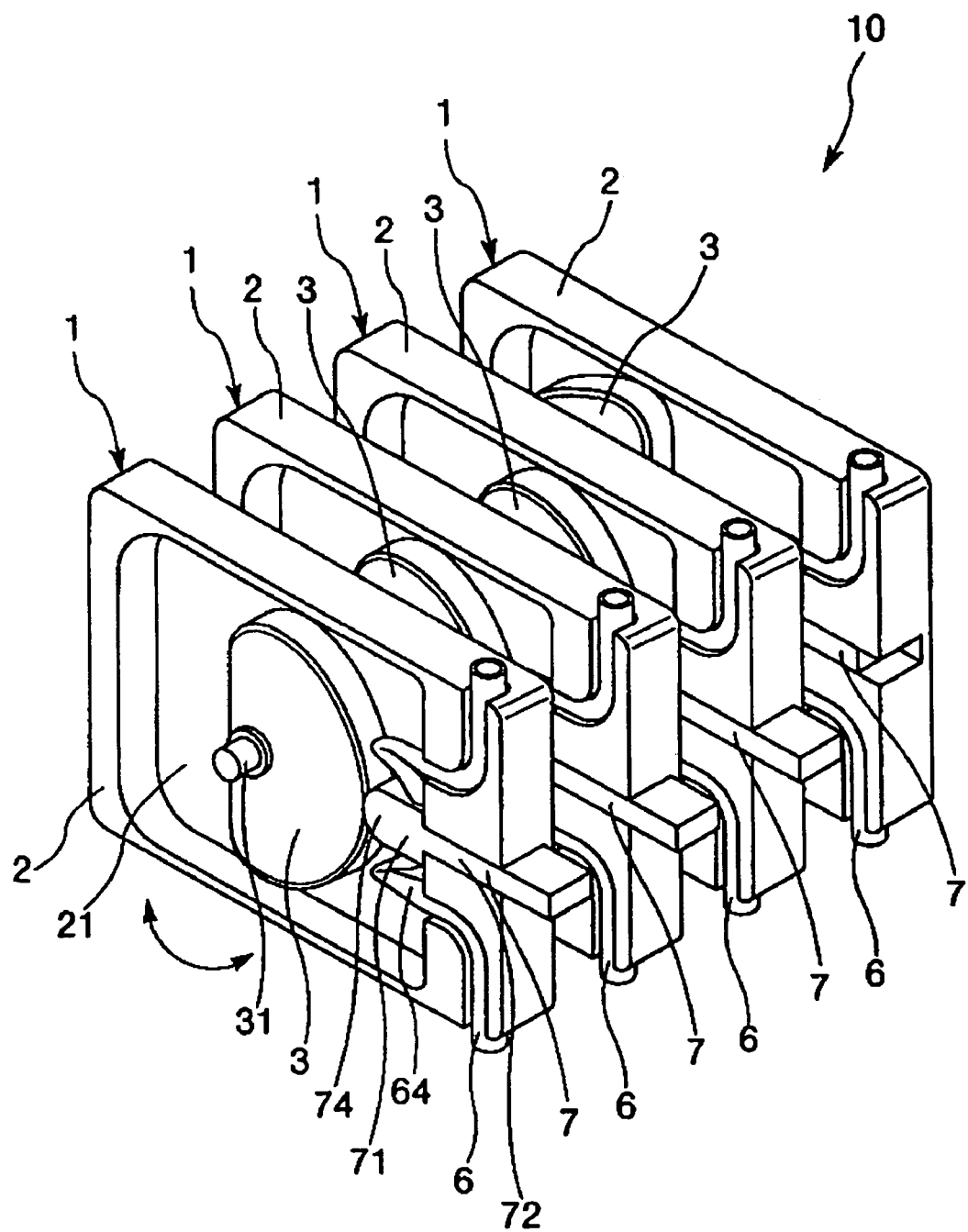
FIG. 12 is a perspective view showing a tube valve apparatus in a fifth embodiment according to the present invention.
Figure 13:
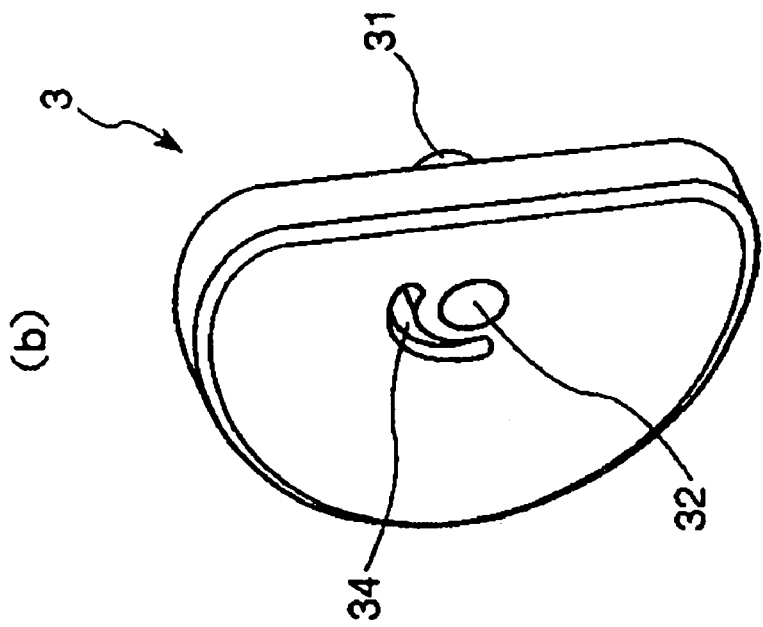
FIG. 13 is a perspective view showing the rotor of each tube valve in the tube valve apparatus shown in FIG. 12.
Figure 13:
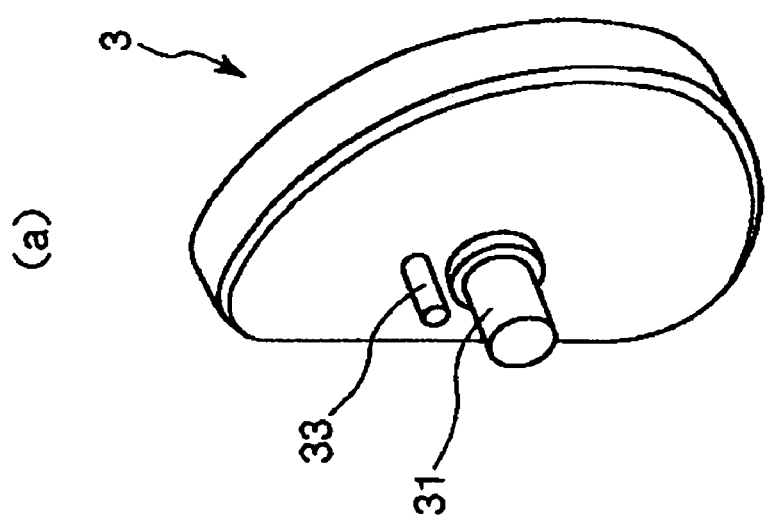
Figure 14:
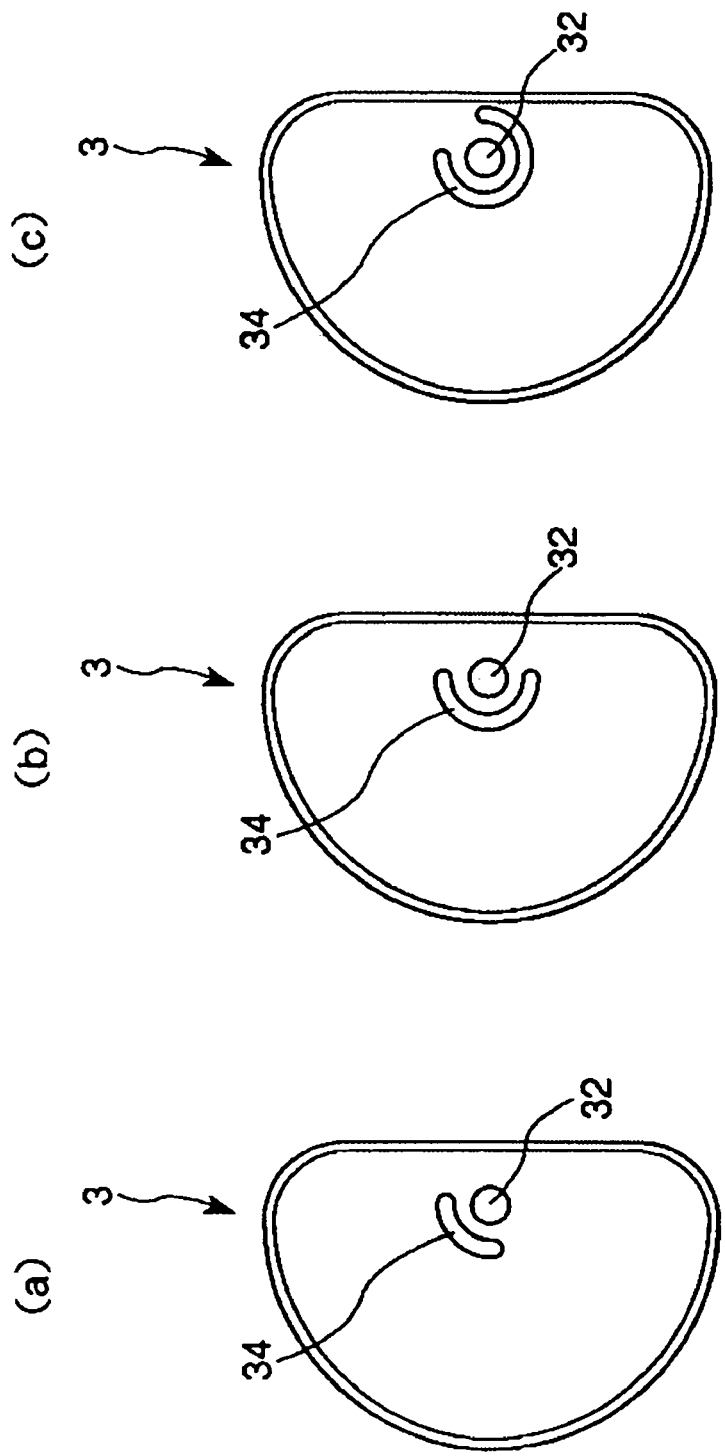
FIG. 14 is a plan view showing the rotor of each tube valve in the tube valve apparatus shown in FIG. 12.

FIG. 12 is a perspective view showing a tube valve apparatus in a fifth embodiment according to the present invention. FIG. 13 is a perspective view showing the rotor of each tube valve in the tube valve apparatus shown in FIG. 12. FIG. 14 is a plan view showing the rotor of each tube valve in the tube valve apparatus shown in FIG. 12. In this case, FIGS. 13(a) and 13(b) respectively show a perspective view of the rotor when viewed from the back side of the rotor, and a perspective view of the rotor when viewed from the front side of the rotor. Further, FIGS. 14(a), 14(b) and 14(c) respectively show the rotor of the third tube valve unit from the left in FIG. 12, the rotor of the second tube valve unit from the left in FIG. 12, and the rotor of the leftmost tube valve unit in FIG. 12.

In the description of the tube valve 1 of the fifth embodiment given below, the focus of the description is on the different points between the fourth embodiment described above and the fifth embodiment, and a description of the same parts is omitted.

As shown in these drawings, the tube valve apparatus 10 (tube valve units 1) of the fifth embodiment has a specific feature in the point that the tube valve apparatus 10 has two modes including a first mode in which the opening/closing mechanism can selectively open and/or close the flow path or flow paths of one predetermined tube 6 or two or more predetermined tubes 6 among the four tubes 6, and a second mode in which the opening/closing mechanism can open and/or close the flow paths of all of the four tubes 6.

The constitution of the tube valve apparatus 10 of the fifth embodiment is substantially similar to the tube valve apparatus 10 of the fourth embodiment described above except for the rotors 3.

As shown in FIG. 13, a shaft 31 having a substantial circular shape when viewed from a side of the rotor 3 is formed at a position corresponding to a shaft 53 of the motor 5 on one face of the rotor 3 in the tube valve unit 1, while a concave portion 32 having a substantial circular shape when viewed from a side of the rotor 3 is formed at a position corresponding to the shaft 31 on the other face of the rotor 3. A size of the concave portion 32 is arranged to be slightly larger than a size of the shaft 31 so that the shaft 31 of another rotor 3 can be inserted into the concave portion 32 and the other rotor 3 can be rotated with respect to the one rotor 3 smoothly.

Further, a pin 33 is formed near the shaft 31 on the one face on which the shaft 31 of the rotor 3 is formed, while a groove 34 in which the pin 33 of another rotor 3 is to be inserted is formed near the concave portion 32 on the other face on which the concave portion 32 of the rotor 3 is formed. A pattern of the groove 34 is an arc shape in which the center of the arc corresponds with a center axis of the concave portion 32 (shaft 31) when viewed from a top of rotor 3.

However, a pin 33 is not formed on the rotor 3 of the leftmost tube valve unit 1 in FIG. 12, and a groove 34 is not formed in the rotor 3 of the rightmost tube valve unit 1 in FIG. 12.

The shaft 31 of each of the rotors 3 is inserted into the concave portion 32 of the adjacent rotor 3. In this way, each rotor 3 can be rotated with the shaft 31 as a rotation axis thereof with respect to the adjacent rotor 3.

Further, the shaft portion 53 of the motor 5 is inserted into the concave portion 32 of the rightmost tube valve unit 1 in FIG. 12 and fixed to this concave portion 32.

The pin 33 of each of the rotors 3 is inserted into the groove 34 of the adjacent rotor 3 so as to be able to slide along the groove 34.

Moreover, a formation range (formation angle) of the groove 34 of each of the rotors 3 is different from a formation range of the groove 34 of the adjacent rotor 3 by 90 degrees with the center angle.

Namely, as shown in FIG. 14(c), the groove 34 of the leftmost tube valve unit 1 in FIG. 12 is formed so that the center angle of the groove 34 becomes substantial 270 degrees. As shown in FIG. 14(b), the groove 34 of the second tube valve unit 1 from the left in FIG. 12 is formed so that the center angle of the groove 34 becomes substantial 180 degrees. As shown in FIG. 14(a), the groove 34 of the third tube valve unit 1 from the left in FIG. 12 is formed so that the center angle of the groove 34 becomes substantial 90 degrees.

In this tube valve apparatus 10, only the rotor 3 of the rightmost tube valve unit 1 in FIG. 12 is directly driven and rotated by the driving of the motor 5. The transmission of the driving force from the rotor 3 of the rightmost tube valve unit 1 in FIG. 12 to the rotor 3 of the third tube valve unit 1 from the left in FIG. 12, the transmission of the driving force from the rotor 3 of the third tube valve unit 1 from the left in FIG. 12 to the rotor 3 of the second tube valve unit 1 from the left in FIG. 12, and the transmission of the driving force from the rotor 3 of the second tube valve unit 1 from the left in FIG. 12 to the rotor 3 of the leftmost tube valve unit 1 in FIG. 12 are carried out by the pin 33 of the one rotor 3 and the groove 34 of the other rotor 3 of the corresponding two rotors 3. Therefore, the pin 33 and groove 34 of the rotor 3 constitute a main part of a power transmission mechanism.

When the rotor 3 of the rightmost tube valve unit 1 in FIG. 12 is rotated in a clockwise direction, the pin 33 of this rotor 3 slides along the groove 34 of the rotor 3 of the third tube valve unit 1 from the left in FIG. 12. Then, when the rotor 3 of the rightmost tube valve unit 1 is rotated 90 degrees in the clockwise direction, the pin 33 thereof reaches and abuts on one end of the groove 34 of the rotor 3 of the third tube valve unit 1 from the left in FIG. 12 (i.e., the driven rotor 3) to transmit the driving force from the pin 33 of the rotor 3 of the rightmost tube valve unit 1 to the rotor 3 of the driven rotor 3. Thus, the rotor 3 of the third tube valve unit 1 from the left in FIG. 12 is rotated in the clockwise direction together with the rotor 3 of the rightmost tube valve unit 1. At this state, a phase difference between the rotor 3 of the rightmost tube valve unit 1 and the rotor 3 of the third tube valve unit 1 from the left in FIG. 12 becomes 90 degrees.

On the other hand, when the rotor 3 of the rightmost tube valve unit 1 in FIG. 12 is rotated in a counterclockwise direction at the state described above, the pin 33 of this rotor 3 slides along the groove 34 of the rotor 3 of the third tube valve unit 1 from the left in FIG. 12 in the reverse direction described above. Then, when the rotor 3 of the rightmost tube valve unit 1 is rotated 90 degrees in the counterclockwise direction, the pin 33 thereof reaches and abuts on the other end of the groove 34 of the rotor 3 of the third tube valve unit 1 from the left in FIG. 12 (i.e., the driven rotor 3) to transmit the driving force from the pin 33 of the rotor 3 of the rightmost tube valve unit 1 to the rotor 3 of the driven rotor 3. Thus, the rotor 3 of the third tube valve unit 1 from the left in FIG. 12 is rotated in the counterclockwise direction together with the rotor 3 of the rightmost tube valve unit 1. At this state, a phase difference between the rotor 3 of the rightmost tube valve unit 1 and the rotor 3 of the third tube valve unit 1 from the left in FIG. 12 becomes 0 degree (i.e., the phase of the rotor 3 of the rightmost tube valve unit 1 in FIG. 12 is the same as the phase of the rotor 3 of the third tube valve unit 1 from the left in FIG. 12).

In this way, the tube valve apparatus 10 can select any one of a first mode in which the flow paths of the tubes 6 of the rightmost tube valve unit 1 and the third tube valve unit 1 from the left in FIG. 12 are opened and/or closed simultaneously, and a second mode in which the flow path of the rotor 3 of either the rightmost tube valve unit 1 or the third tube valve unit 1 from the left in FIG. 12 is opened and/or closed.

Subsequently, the transmission of the driving force from the rotor 3 of the third tube valve unit 1 from the left in FIG. 12 to the rotor 3 of the second tube valve unit 1 from the left in FIG. 12, and the transmission of the driving force from the rotor 3 of the second tube valve unit 1 from the left in FIG. 12 to the rotor 3 of the leftmost tube valve unit 1 in FIG. 12 are also the same as described above.

For example, when the rotor 3 of the rightmost tube valve unit 1 in FIG. 12 is rotated 270 or more degrees in the clockwise direction, the phase of the rotor 3 in each of the tube valve units 1 deviates from the phase of the adjacent rotor 3 by 90 degrees in the same direction.

Further, when the rotor 3 of the rightmost tube valve unit 1 in FIG. 12 is rotated 270 or more degrees in the counterclockwise direction at the state described above, a phase difference between the rotor 3 of the rightmost tube valve unit 1 and the rotors 3 of the other tube valve units 1 becomes 0 degree (i.e., the phase of the rotor 3 of the rightmost tube valve unit 1 in FIG. 12 is the same as the phase of the rotor 3 of any one of the other tube valve units 1 in FIG. 12).

In this way, the tube valve apparatus 10 can select any one of a first mode in which the flow paths of all of the tubes 6 of the tube valve units 1 are opened and/or closed simultaneously, and a second mode in which the flow path or flow paths of the rotor 3 of the tube 6 or the two or more tubes 6 in one predetermined tube valve unit 1 or the two or more predetermined tube valve units 1 is or are opened and/or closed.

In this case, in the first mode, a state where the flow paths of the tubes 6 in all the tube valve units 1 are opened and a state where the flow paths of the tubes 6 in all the tube valve units 1 are closed can be taken (selected).

On the other hand, in the second mode, a state where the flow path or flow paths of the tube 6 or tubes 6 in one predetermined tube valve unit 1 or two or more predetermined tube valve units 1 is or are opened, and a state where the flow paths of the tubes 6 in all the tube valve units 1 is or are closed can be taken (selected).

According to this tube valve apparatus 10 (the tube valve unit 1), it is also possible to obtain the effects similar to those of the fourth embodiment described above.

Sixth Embodiment

Next, a tube valve (tube valve apparatus) in a sixth embodiment according to the present invention will be described.

Figure 15:
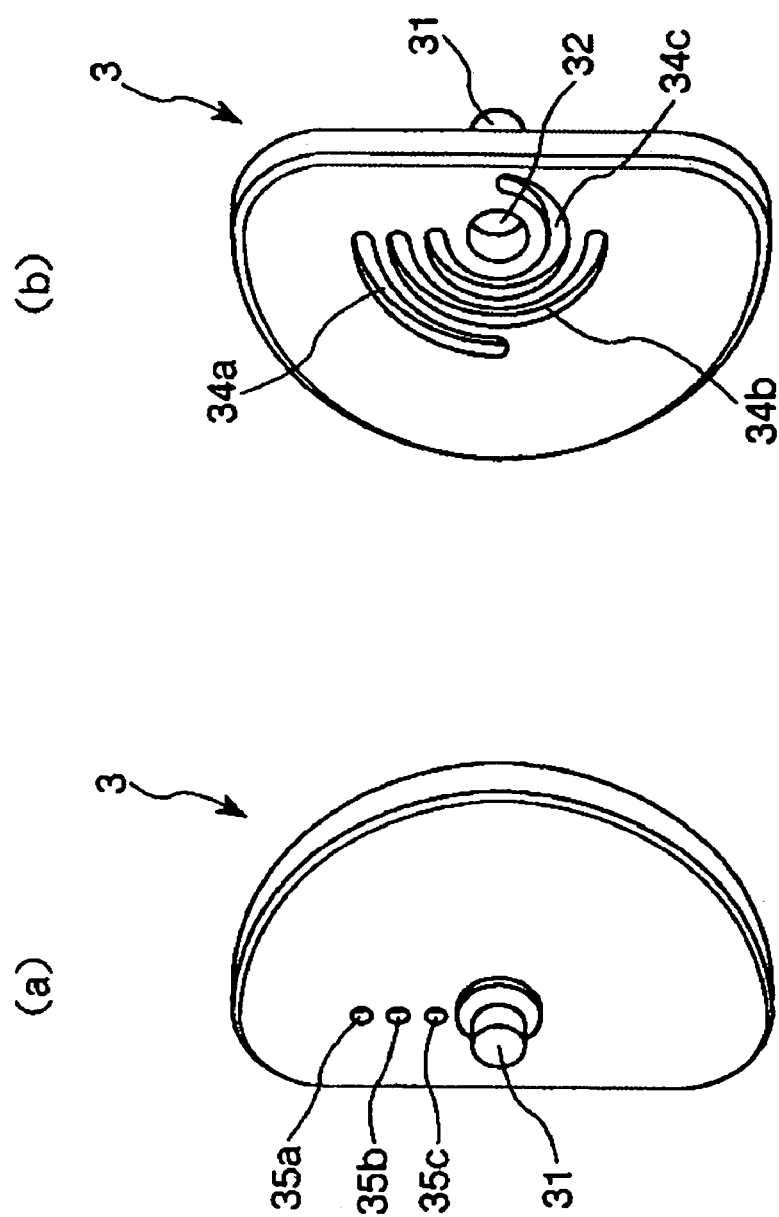
FIG. 15 is a perspective view showing a rotor of each tube valve in a tube valve apparatus in a sixth embodiment according to the present invention.
Figure 16:
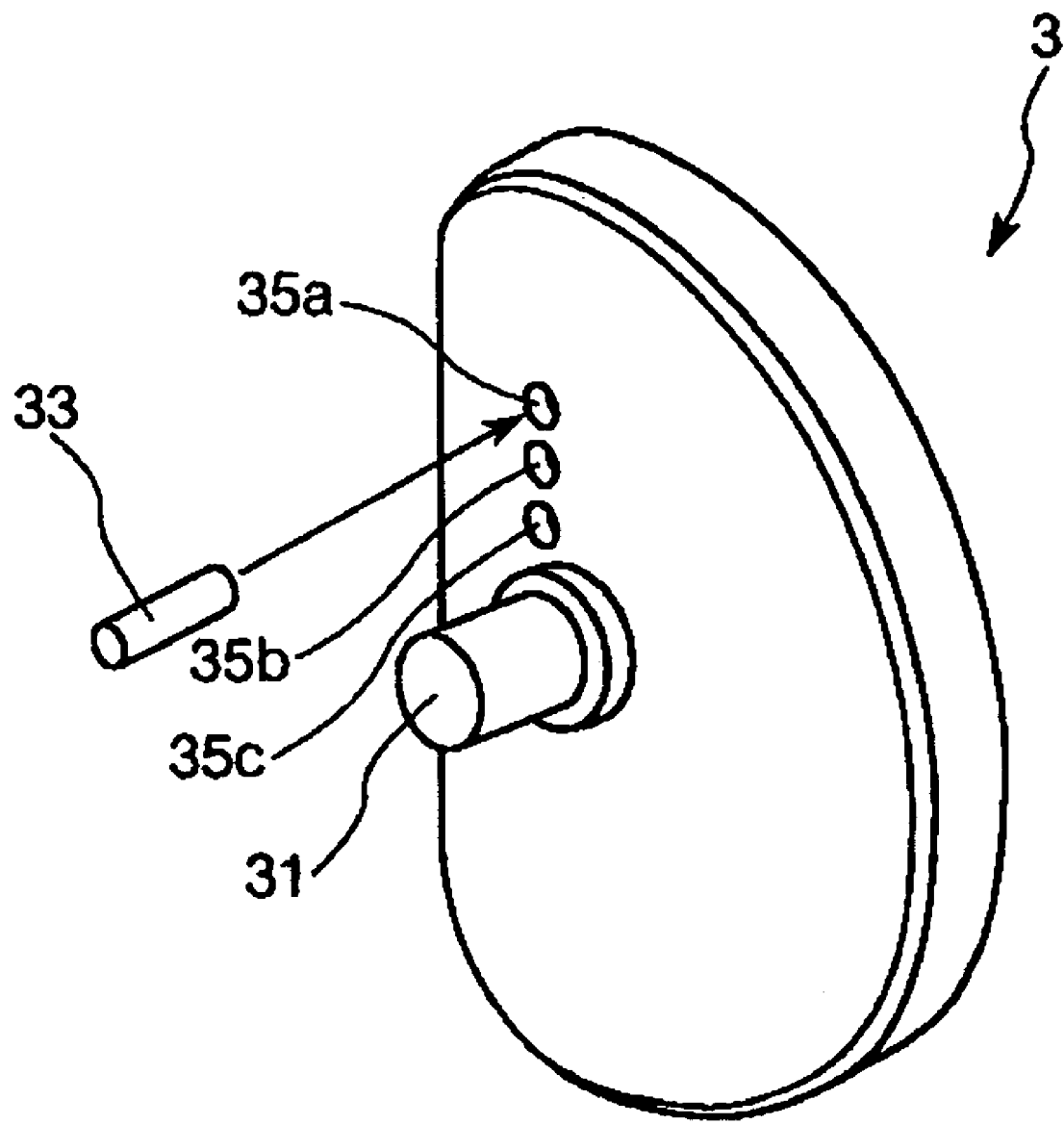
FIG. 16 is a perspective view showing a rotor of each tube valve in the tube valve apparatus in the sixth embodiment according to the present invention.

FIGS. 15 and 16 are perspective views each showing a rotor of each tube valve in a tube valve apparatus in a sixth embodiment according to the present invention. In this case, FIGS. 15(a) and 15(b) respectively show a perspective view of the rotor when viewed from the back side of the rotor, and a perspective view of the rotor when viewed from the front side of the rotor.

In the description of the tube valve apparatus 10 of the sixth embodiment given below, the focus of the description is on the different points between the fifth embodiment described above and the sixth embodiment, and a description of the same parts is omitted.

As shown in these drawings, the tube valve apparatus 10 (tube valve units 1) of the sixth embodiment has a specific feature in the point that the tube valve apparatus 10 is constructed so as to be able to set up and manufacture the rotors 3 using common members (common components) while the tube valve apparatus 10 is assembled.

Namely, as shown in FIG. 15, the rotor 3 is formed so that three concave portions 35a, 35b and 35c into which a pin 33 can be inserted are provided near the shaft 31 thereof on the face on which the shaft 31 of the rotor 3 is formed.

The concave portions 35a, 35b and 35c are arranged in a spaced manner at a predetermined interval along the radial direction of the rotor 3. Further, the concave portions 35a, 35b and 35c are arranged in this order from the shaft 31 side toward the outer peripheral side. In this regard, as shown in FIG. 16, the pin 33 is manufactured as a separate element, and inserted into and fixed to any one of the concave portions 35a, 35b and 35c.

Further, as shown in FIG. 15, three grooves 34a, 34b and 34c are formed near the concave portion 32 on the face on which the concave portion 32 of the rotor 3 is formed.

Patterns of the grooves 34a, 34b and 34c are respectively arc shapes concentrically in which the center of each of the arcs corresponds with a center axis of the concave portion 32 (shaft 31) when viewed from a top of rotor 3.

Further, a formation range (formation angle) of each of the grooves 34a, 34b and 34c is different from a formation range of the adjacent groove 34 by 90 degrees with the center angle.

Namely, the inmost groove 34c is formed substantial 270 degrees with the center angle, the groove 34b outside the groove 34c is formed substantial 180 degrees with the center angle, and the groove 34a outside the groove 34b (i.e., outermost groove) is formed substantial 90 degrees with the center angle.

In this way, pins 33 attached in the concave portions 35a, 35b and 35c of the rotor 3 are respectively inserted into the grooves 34a, 34b and 34c of the adjacent rotor 3 when the tube valve apparatus 10 is assembled.

Thus, in the case where this rotor 3 is used as the rotor 3 of the rightmost tube valve unit 1 in FIG. 12 in the tube valve apparatus 10 of the fifth embodiment described above, as shown in FIG. 16, the pin 33 is inserted into and fixed to the concave portion 35a of this rotor 3.

Further, in the case where this rotor 3 is used as the rotor 3 of the third tube valve unit 1 from the left in FIG. 12 in the tube valve apparatus 10 of the fifth embodiment described above, the pin 33 is inserted into and fixed to the concave portion 35b of this rotor 3.

Moreover, in the case where this rotor 3 is used as the rotor 3 of the second tube valve unit 1 from the left in FIG. 12 in the tube valve apparatus 10 of the fifth embodiment described above, the pin 33 is inserted into and fixed to the concave portion 35c of this rotor 3.

Furthermore, in the case where this rotor 3 is used as the rotor 3 of the leftmost tube valve unit 1 in FIG. 12 in the tube valve apparatus 10 of the fifth embodiment described above, there is no need to insert the pin 33 into any one of the concave portions 35a, 35b and 35c.

According to this tube valve apparatus 10, it is possible to obtain the effects similar to those of the fifth embodiment described above.

Further, because this tube valve apparatus 10 is constructed so as to be able to set up and manufacture the rotors 3 using common members (common components) while the tube valve apparatus 10 is assembled, it is possible to reduce the number of components, whereby it is possible to reduce the manufacturing cost thereof.

Seventh Embodiment

Next, a tube valve in a seventh embodiment according to the present invention will be described.

Figure 17:
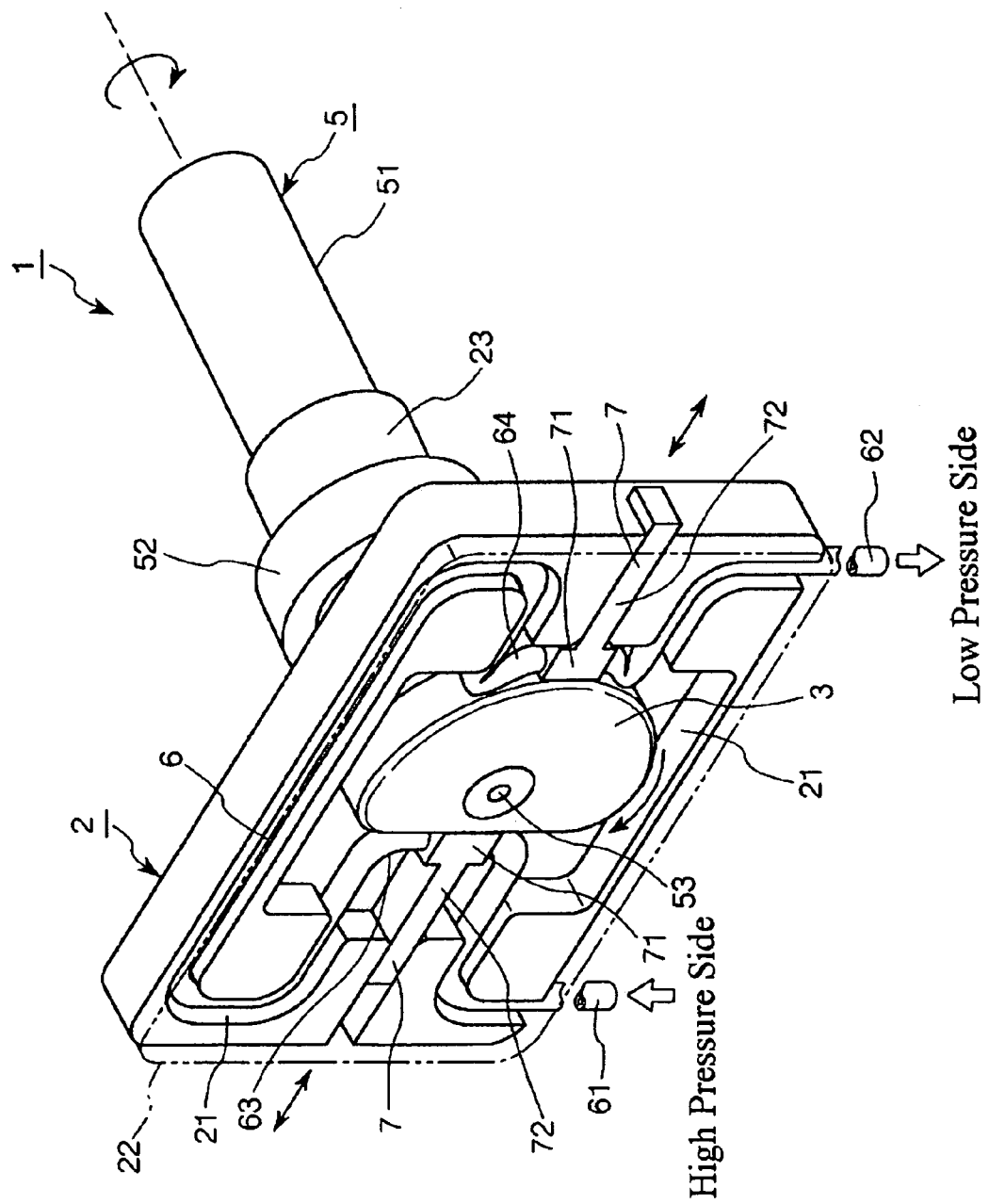
FIG. 17 is a perspective view showing a tube valve in a seventh embodiment according to the present invention.
Figure 18:
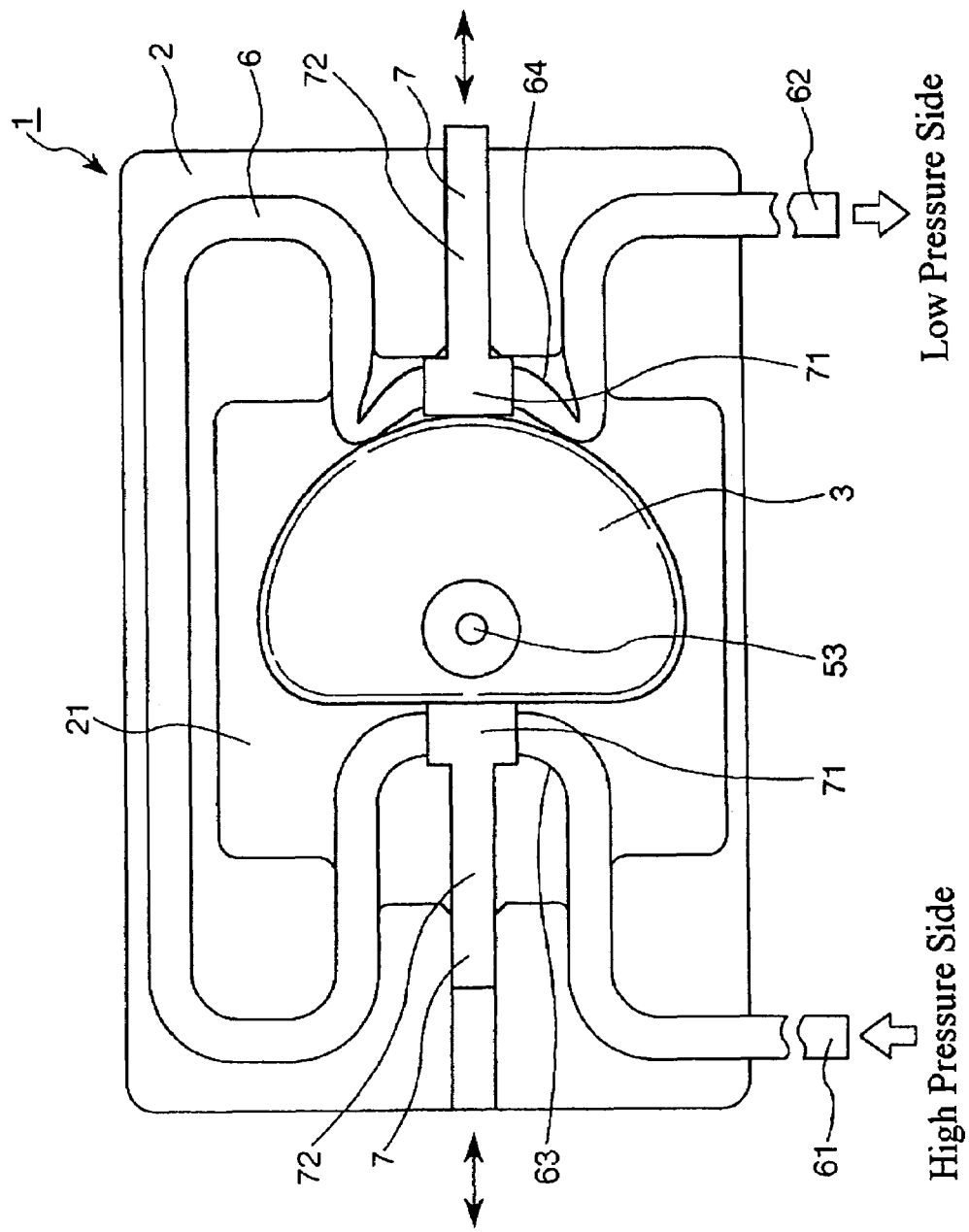
FIG. 18 is a plan view of the tube valve shown in FIG. 17.
Figure 19:
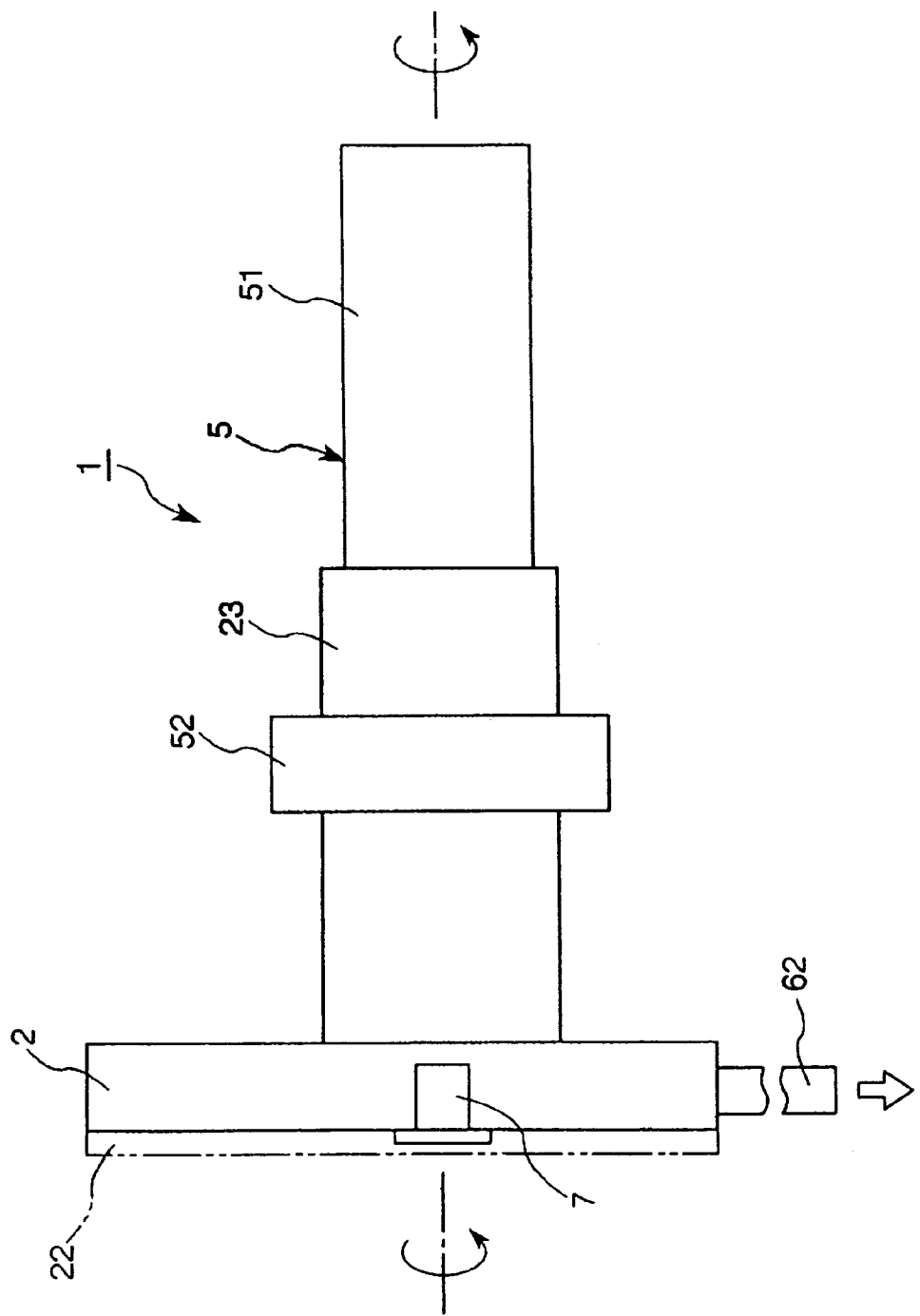
FIG. 19 is a side view (right side view) of the tube valve shown in FIG. 17.

FIG. 17 is a perspective view showing a tube valve in a seventh embodiment according to the present invention. FIG. 18 is a plan view of the tube valve shown in FIG. 17. FIG. 19 is a side view (right side view) of the tube valve shown in FIG. 17.

A tube valve 1 shown in these drawings has a special feature in the point that a flow path of a fluid is constituted from the internal cavity of a tube (tubular member) 6 and the flow rate of the flowing fluid is controlled by folding the tube 6 at any one of two places (points) (i.e., two curved portions) to close (shut) the flow path of the fluid. Namely, two portions (opening/closing portion) where the flow path inside the tube 6 is opened and closed are provided at two places in the tube valve 1, and by bending each opening/closing portion, namely, each of two bendable parts (bending portions 63, 64) of the tube 6, the tube 6 is folded to close the flow path, and then the fold of the tube 6 is released to open (reopen) the flow path. Hereinafter, a description thereof is given with reference to the drawings.

As shown in FIGS. 17-19, the tube valve 1 includes a flexible (restorable) tube 6, a frame (board) 2, a rotating element (rotor) 3, a motor (driving source) 5, and two guides (guide means) 7. In this case, the rotor 3 and the motor 5 form the main portion of an opening/closing mechanism that folds the tube 6 to close the flow path, and releases the fold of the tube 6 to open the flow path.

The frame 2 is constructed from a plate-shaped member which forms a substantial rectangle when viewed from a top of the frame 2. The frame 2 includes a concave portion 21 having a predetermined shape in the flat portion thereof in the left side in FIG. 19. The rotor 3, the tube 6 and the guides 7 are housed in this concave portion 21, and these are arranged substantially in the same plane. In this way, the relative position relationship and displacing direction of the rotor 3, the tube 6 and the guides 7 are controlled.

Further, in a state in which the rotor 3, the tube 6 and the guides 7 are housed inside the concave portion 21, a cover 22 is attached to the frame 2 from the left side in FIG. 19. In this way, the rotor 3, the tube 6 and the guides 7 are held inside the concave portion 21 and prevented from protruding out.

Moreover, a tubular portion 23 is provided on the frame 2 at the right side in FIG. 19. The motor 5 is housed inside this tubular portion 23.

In this regard, there is no particular limitation to the construction material of the frame 2, but various resin materials are preferred. By using a resin material, it becomes possible to construct a lightweight frame 2.

The rotor 3 is a plane cam, and is constructed by a disc member having a substantially semicircular shape when viewed from a top of the tube valve 1 shown in FIG. 18. The outer peripheral portion of the rotor 3 is a cam portion, namely, the outer peripheral surface forms a cam surface. The rotor 3 is housed inside the concave portion 21 of the frame 2 in a manner that enables the rotor 3 to rotate substantially parallel with respect to the frame 2.

Further, the rotor 3 is fixed to a shaft portion 53 of the motor 5, and driving force (torque) is applied to the rotor 3 from the motor 5 via this shaft portion 53. In this way, when the rotor 3 is rotated with respect to the shaft portion 53 serving as a rotation axis, the outer peripheral surface (cam surface) thereof operates the guides 7, whereby the guides 7 undergo periodic motion (reciprocating motion) in accordance with the peripheral surface shape (the shape of the cam surface) of the rotor 3. In this way, the tube 6 is bent at the bendable parts (bending portions 63, 64) to be folded there, and the fold of the tube 6 is released (i.e., the bend of the tube 6 is restored). In this regard, the relationship with the fold of the tube 6 when the rotor 3 is rotated is described later.

Moreover, the outer peripheral surface of the rotor 3 is formed as a smooth surface. Namely, the angular portions of the semicircular shape are rounded. In this way, when the tube valve 1 is driven (operated), the outer peripheral surface of the rotor 3 is prevented from catching the guides 7, and this makes it possible to drive the tube valve 1 more smoothly.

The revolutions and the rotation speed (rotation frequency) of the rotor 3 are controlled by controlling the driving of the motor 5.

In this regard, there is no particular limitation to the construction material of the rotor 3, but various resin materials are preferred. By using a resin material, it becomes possible to construct a lightweight rotor 3.

The tip of the motor 5 is inserted into the tubular portion 23 of the frame 2, and the motor 5 is fixed to the frame 2 by fastening a fixing ring 52 from the outer periphery of the tubular portion 23 to a main portion 51 of the motor 5. Further, the shaft portion 53 of the motor 5 is inserted through the frame 2, and the rotor 3 is fixed to the tip of the shaft portion 53 (see FIGS. 17 and 19). In this way, the motor 5 rotates the rotor 3 from the right side of the frame 2 in FIG. 19.

In the present embodiment, a motor equipped with a speed reducer (decelerator) having a planetary gear and the like is used as the motor 5, and therefore the motor 5 rotates at low speed to obtain a high torque. Namely, by having the motor 5 rotate at low speed, the rotor 3 can be rotated at low speed without providing a separate speed reducing mechanism, and for this reason, when the tube 6 is restored to the original shape, the tube 6 can be followed adequately.

In this case, other types of motors or other driving sources may be used as the motor 5.

The tube 6 is a tubular member having flexibility that makes it possible to easily fold the tube 6 by external force, and restorability that restores the tube 6 to its original shape when such external force is removed. Namely, the tube 6 can be easily folded by force (load) from a direction (radial direction) substantially perpendicular to the longitudinal direction thereof, and the tube 6 can be restored to its original shape when such force is removed.

The internal cavity of the tube 6 forms a flow path through which a fluid flows. In this regard, there is no particular limitation to the flowing fluid, and various gases, various liquids or the like may be used, for example.

Further, when the tube 6 is folded (when the amount of folding reaches a predetermined amount), the flow path is closed, and when the fold of the tube 6 is released (when the tube 6 is restored to its original shape), the flow path is opened.

In this regard, the restoring force of the tube 6 becomes larger as the pressure inside the flow path becomes higher.

There is no particular limitation to the construction material of the tube 6, and various rubber materials such as silicone rubber, various thermoplastic elastomers and the like, and various resin materials may be used, for example. Among these materials, elastic materials such as the various rubber materials and the various thermoplastic elastomers and the like are preferred from the point of having superior foldability and restorability.

Further, in the present embodiment, one end portion 61 of the tube 6 is connected to a high pressure side, and the other end portion 62 is connected to a low pressure side. The fluid flows through the inside of the tube 6 from the end portion 61 side (high pressure side) to the end portion 62 side (low pressure side). Alternatively, the one end portion 61 of the tube 6 may be connected to the low pressure side, and the other end portion 62 may be connected to the high pressure side.

Moreover, the tube 6 is housed inside the concave portion 21 of the frame 2. In this way, the tube 6 is provided in the frame 2 in a way that the tube 6 surrounds the outer peripheral surface of the rotor 3 excluding the bottom side portion in FIG. 18.

Bending portions (bendable parts) 63, 64 are established at two places in the tube 6, and by bending each of these bending portions 63, 64, the tube 6 is folded to close the flow path, and the fold of the tube 6 is released (removed) to open the flow path.

In this regard, the tube 6 is arranged so that each of the bending portions 63, 64 is positioned (overlapped) on the rotation path of the outer peripheral surface of the rotor 3. Further, these bending portions 63, 64 are arranged at mutually facing positions on either side of the shaft portion 53 of the rotor 3, namely, at positions shifted 180 degrees with respect to the rotor 3 (see FIG. 18).

When the rotor 3 is rotated, the tube 6 is squeezed by external force received from the outer peripheral surface of the protruding side (the side having the semicircular-shaped arc) of the rotor 3 via each guide 7 described later, whereby substantial M-shaped folds are formed at the bending portions 63, 64 (see the bending portion 64 side in FIG. 18). In this way, the flow path is closed at the bending portions 63, 64. Further, when the rotor 3 is rotated so that the outer peripheral surface of the flat side thereof (the side that does not have the semicircular arc) is moved to a predetermined position, the external force from the rotor 3 is removed, and the tube 6 is restored by the self-restoring force (elastic force), whereby the flow path is opened (see the bending portion 63 side in FIG. 18).

In this way, the tube 6 periodically receives the external force from the outer peripheral surface of the rotor 3 at each of the bending portions 63, 64 by means of the rotation of the rotor 3, whereby the bend and restoration of the tube 6, namely, the close and open of the flow path is repeated.

Further, the tube 6 is held (supported) and guided by the guide 7 serving as a first moving element at the upstream side bending portion 63, and the tube 6 is held (supported) and guided by the guide 7 serving as a second moving element at the downstream side bending portion 64.

Each guide 7 is formed to have an overall substantial T shape, and includes a tubular holding portion (support portion) 71, and a rod-shaped sliding portion 72 provided substantially perpendicular to the holding portion 71. The tube 6 is inserted through the holding portion 71 of each guide 7, and is held (supported) by such holding portions 71. In this regard, a contact portion which makes contact with the outer peripheral portion (cam portion), namely, the outer peripheral surface (cam surface) of the rotor 3 is formed by the portion (outside surface) of the holding portion 71 of each guide 7 at the side of the rotor 3.

Further, each guide 7 is housed in the concave portion 21 of the frame 2. The concave portion 21 of the frame 2 is formed to have a groove shape that corresponds to the sliding portion 72 of each guide 7 at the portion where the sliding portion 72 is arranged (housed), and these grooves restrict the sliding direction (moving direction) of the sliding portions 72. Each guide 7 slides along the corresponding groove in the concave portion 21 in a radial direction of the rotor 3 with respect to the frame 2. Namely, when the tube valve 1 is driven, the periodic rotational motion of the rotor 3 is converted to linear motions of the guides 7 in radial directions of the rotor 3 by means of the outer peripheral surface of the rotor 3, the guides 7 and the grooves of the concave portion 21.

In this regard, each guide 7 undergoes a linearly reciprocating motion inside the flat surface of the frame 2 to control the bending direction of the tube 6 so that each of the bending portions 63, 64 of the tube 6 is reliably bent into a substantial M shape to close the flow path and then restored to open the flow path. This makes it possible to open and close the flow path inside the tube 6 reliably.

Further, because each guide 7 is arranged between the outer peripheral surface of the rotor 3 and the tube 6 to prevent the contact between the rotor 3 and the tube 6. This makes it possible to prevent the tube 6 from being damaged by contact with the rotor 3.

In this regard, there is no particular limitation to the construction material of the guides 7, but various resin materials are preferred. By using a resin material, it becomes possible to construct lightweight guides 7.

Next, the operation of the tube valve 1 will be described.

Figure 20:
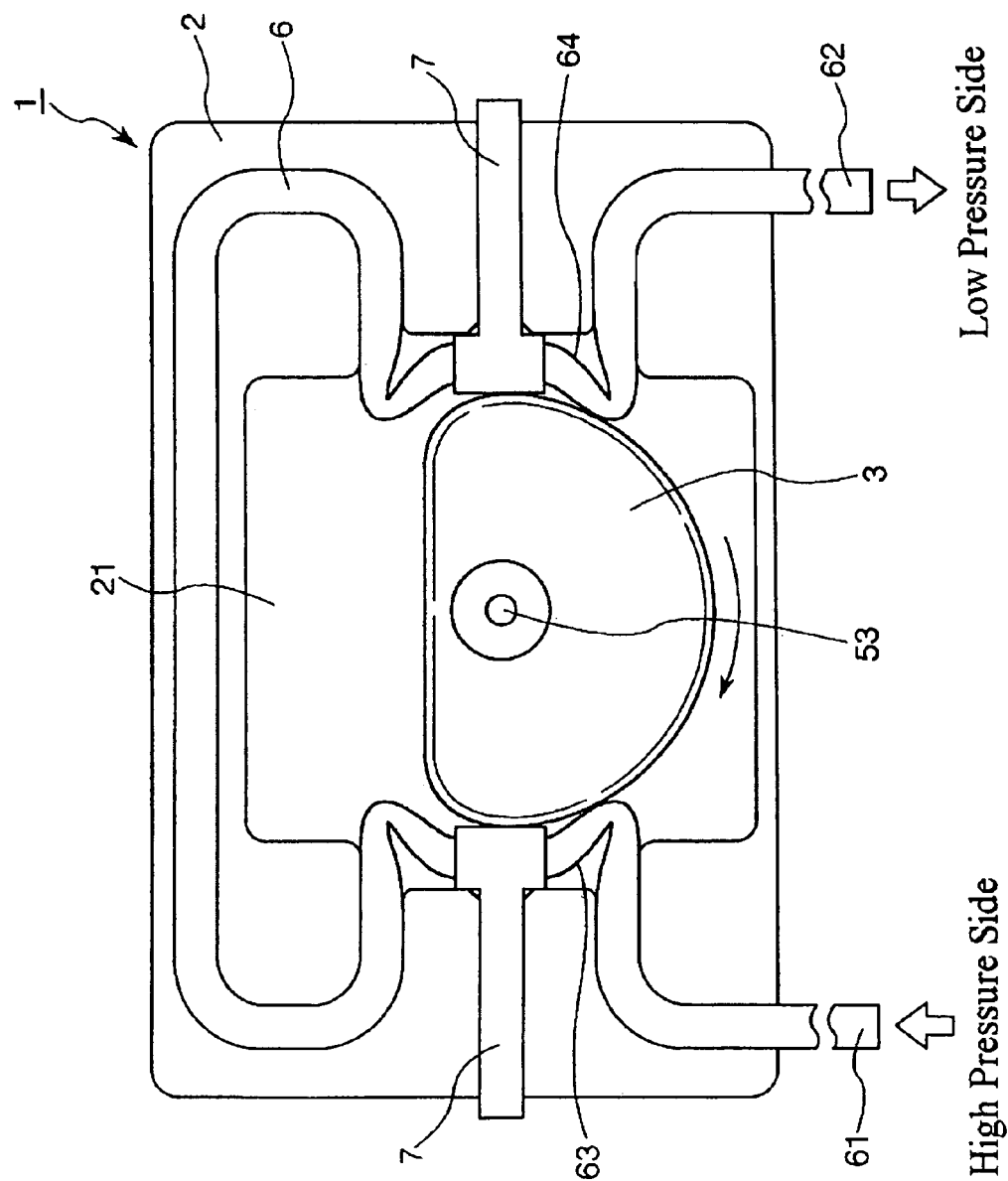
FIG. 20 is a plan view of the tube valve 1 shown in FIG. 17.
Figure 21:
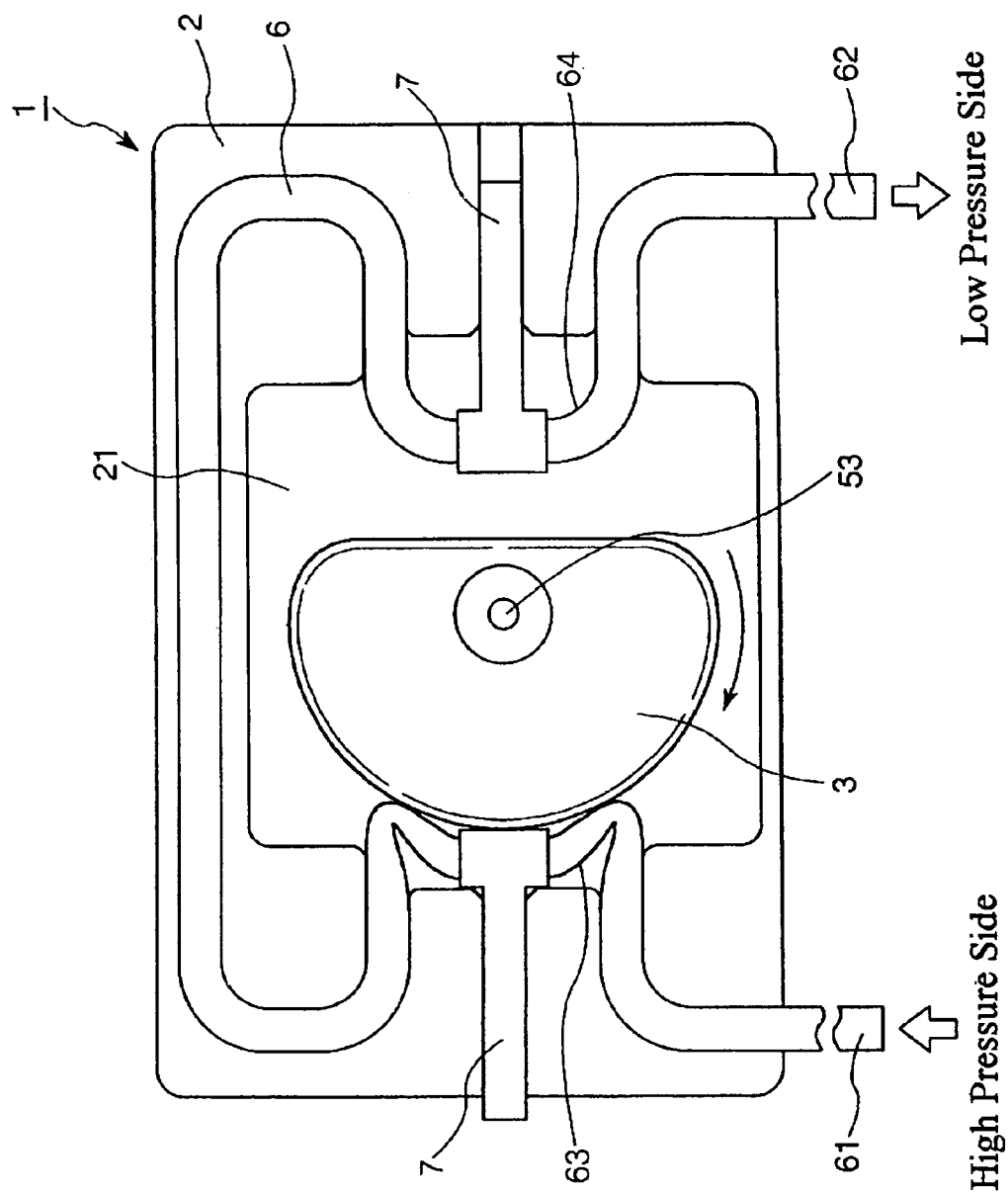
FIG. 21 is a plan view of the tube valve 1 shown in FIG. 17.
Figure 22:
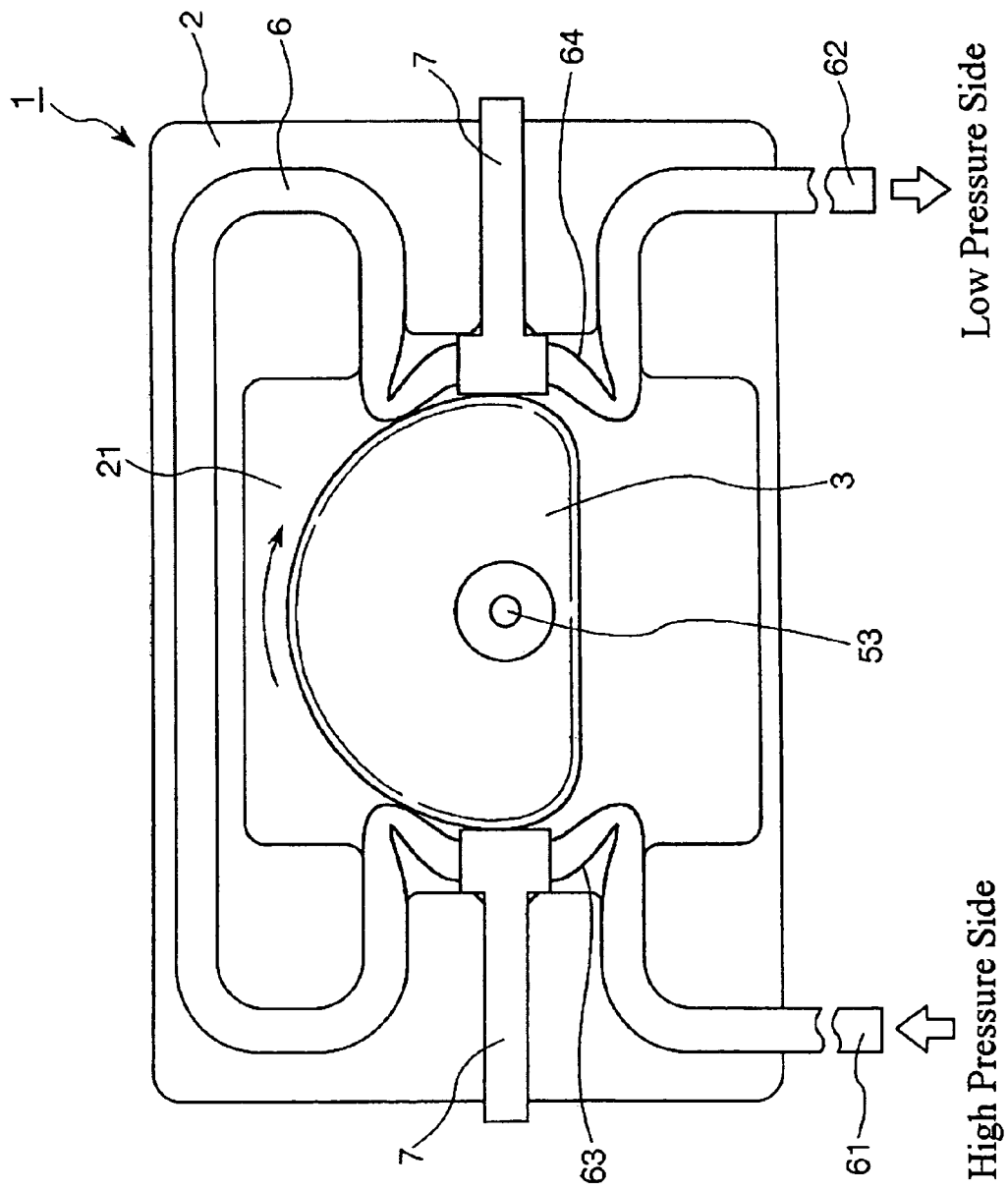
FIG. 22 is a plan view of the tube valve 1 shown in FIG. 17.
Figure 23:
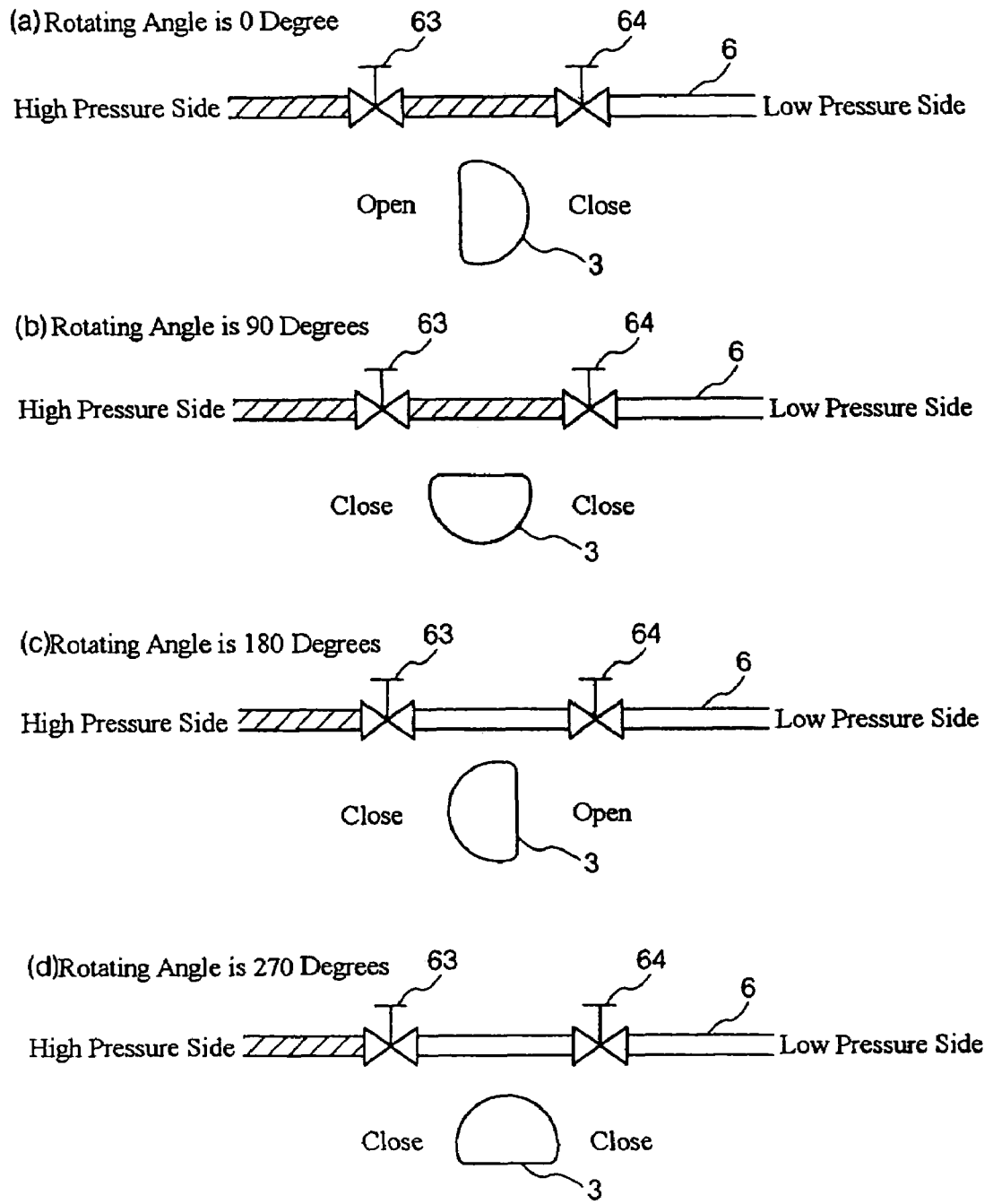
FIG. 23 is a drawing for describing the operation of the tube valve shown in FIG. 17.

FIGS. 20-22 are plan views of the tube valve 1 shown in FIG. 17. FIG. 23 is a drawing for describing the operation of the tube valve 1 shown in FIG. 17. With the tube valve 1 shown in FIG. 18 representing the initial state, FIGS. 20-22 respectively show the state where the rotor 3 is rotated 90 degrees (FIG. 20), the state where the rotor 3 is rotated 180 degrees (FIG. 21), and the state where the rotor 3 is rotated 270 degrees (FIG. 22) in the clockwise direction from the initial state. Further, with the initial state shown in FIG. 18 representing 0 degree (see FIG. 23(*a*)), FIG. 23 conceptually shows the states where the rotor 3 is rotated 90 degrees (see FIGS. 23(*b*) and 20), 180 degrees (see FIGS. 23(*c*) and 21) and 270 degrees (see FIGS. 23(*d*) and 22).

When the tube valve 1 is driven, the motor 5 is driven to rotate the rotor 3 in the clockwise direction in the drawings. Further, the driving control of the tube valve 1 is carried out by controlling the driving of the motor 5.

In this tube valve 1, in the initial state shown in FIG. 18, the flat side of the rotor 3 faces the upstream side bending portion 63 of the tube 6, and the protruding side of the rotor 3 faces the downstream side bending portion 64 of the tube 6.

In this state, the tube 6 is bent into a substantial M shape only at the downstream side bending portion 64, and the flow path is closed only at this one place. On the other hand, because the flow path is opened at the upstream side bending portion 63, the fluid of the high pressure side flows through the flow path in the bending portion 63 from the high pressure side end portion 61, and fills the tube 6 up to the flow path in the bending portion 64 (i.e., the flow path between the bending portions 63, 64) (see FIG. 23(*a*)). Further, in this state, because the flow path is closed at the downstream side bending portion 64, the fluid is prevented from leaking between the high pressure side and the low pressure side inside the tube 6.

Next, when the rotor 3 is rotated 90 degrees in the clockwise direction as shown in FIG. 20, the upstream side bending portion 63 is bent into a substantial M shape, while the downstream side bending portion 64 is maintained in a bent state. In this way, the flow path is closed at both the upstream side and the downstream side bending portions 63, 64 (see FIG. 23(*b*)). At this time, the fluid from the high pressure side fills (is accumulated in) the inside of the flow path between the bending portions 63, 64 of the tube 6, and the pressure inside the flow path between the bending portions 63, 64 is the same as the pressure of the high pressure side.

Next, when the rotor 3 is rotated another 90 degrees in the clockwise direction as shown in FIG. 21 (i.e., 180 degrees from the initial state shown in FIG. 18), the rotor 3 makes the bend of the downstream side bending portion 64 be removed while maintaining the upstream side bending portion 63 in a bent state. Namely, because the flat side of the rotor 3 faces the downstream side bending portion 64 of the tube 6, the pushing force applied from the rotor 3 to the guide 7 at the bending portion 64 side is removed, and the bending portion 64 is restored by the self-restoring force (i.e., the fold of the tube 6 is released), whereby the flow path of the bending portion 64 is opened.

In this way, the fluid between the bending portions 63, 64 is discharged from the low pressure side end portion 62 to the outside of the tube valve 1 (see FIG. 23(*c*)). Further, the pressure inside the flow path between the bending portions 63, 64 becomes the same as the pressure of the low pressure side. In this state, because the flow path is closed at the upstream side bending portion 63, the fluid is prevented from leaking between the high pressure side and the low pressure side inside the tube 6.

Next, when the rotor 3 is rotated another 90 degrees in the clockwise direction as shown in FIG. 22 (i.e., 270 degrees from the initial state shown in FIG. 18), the rotor 3 bends the tube 6 at the downstream side bending portion 64 into a substantial M shape, while maintaining the upstream side bending portion 63 in a bent state. In this way, the flow path is closed at both the upstream side and downstream side bending portions 63, 64 (see FIG. 23(*d*)). At this time, the pressure inside the flow path between the bending portions 63, 64 of the tube 6 is the same as the pressure of the low pressure side.

Next, when the rotor 3 is rotated another 90 degrees in the clockwise direction as shown in FIG. 18 (one revolution from the initial state shown in FIG. 18), the rotor 3 returns to the initial state shown in FIG. 18 (see FIG. 23(*a*)) and removes the bend of the upstream side bending portion 63 while maintaining the downstream side bending portion 64 in a bent state. Namely, because the flat side of the rotor 3 faces the upstream side bending portion 63 of the tube 6, the force applied from the rotor 3 to the guide 7 at the bending portion 63 side is removed, and the bending portion 63 is restored by the self-restoring force (i.e., the fold of the tube 6 is released), whereby the flow path of the bending portion 63 is opened.

In this way, in the tube valve 1, by rotating the rotor 3, the bending portions 63, 64 of the tube 6 are periodically bent to fold the tube 6 and the flow paths are opened and closed in an alternating manner, whereby a fixed amount of fluid is discharged from the high pressure side to the low pressure side via the tube 6. Namely, every time the rotor 3 is rotated by one revolution, an amount of fluid corresponding to the volume between the bending portions 63, 64 of the tube 6 is discharged from the high pressure side to the low pressure side.

As described above, because the flow path of the fluid is closed by folding the tube 6, the tube valve 1 can reliably open and close the flow path with small driving force compared with a type of tube valve that closes the flow path by squashing the tube 6 with external force.

Further, the tube valve 1 has a structure in which opening/closing portions (closing places) of the flow path at two places, namely, the two bending portions 63, 64 are provided, and every time the rotor 3 rotates by one revolution (one cycle), the fluid that was filled inside the flow path between the bending portions 63, 64 is discharged.

In this way, the flow rate of the fluid discharged from the high pressure side to the low pressure side in one cycle of the tube valve 1 can be quantized. Accordingly, the flow rate of the discharged fluid can be accurately and reliably controlled, and this makes it possible to easily, accurately and reliably discharge a predetermined amount of fluid. Namely, because the amount (volume) of fluid discharged every cycle can be calculated accurately, by adjusting the number of revolutions or the rotation speed of the rotor 3, it is possible to easily, accurately and reliably control the flow rate and the total amount of discharged fluid.

Moreover, in the tube valve 1, the amount of fluid that is filled in the flow path between the bending portions 63, 64 can be set at any desired value by setting (changing) the length between the bending portions 63, 64 of the tube 6 and the area of the cross section (cross-sectional area) of the flow path. In this way, it is possible to set any desired flow rate of the fluid discharged from the high pressure side to the low pressure side in one cycle.

In this case, for example, by shortening the length between the bending portions 63, 64 of the tube 6, or by setting a cross-sectional area of the flow path inside the tube 6 at a small size, the amount (volume) of fluid filled inside the flow path between the bending portions 63, 64 of the tube 6 can be made very small, and this makes it possible to make the flow rate of the fluid discharged from the high pressure side to the low pressure side in one cycle very small. For this reason, there is a particular advantage in the case where the tube valve 1 is applied to an apparatus that sprays out or sucks in a very small quantity of fluid.

Further, in the tube valve 1, as described above, because at least one of the bending portions 63, 64 is constantly bent with the flow path thereof closed (see FIG. 23), i.e., because the opening/closing mechanism always folds the tube 6 at any one of the bending portions 63, 64, the high pressure side and the low pressure side do not make direct contact through the tube 6.

Moreover, in the tube valve 1, because a single rotor 3 having a cam portion is used to periodically open and close the flow path at the two places of the tube 6, the number of parts (components) can be reduced, the structure can be simplified, there is an advantage in miniaturization, and it is possible to easily and reliably control opening and closing of the flow path.

Further, compared with a prior art electromagnetic valve or a type of tube valve that closes the flow path by squashing the tube 6, the tube valve 1 has an advantage of requiring only a small amount of energy (consumed power) for driving.

In addition, the tube valve 1 can be made lightweight by forming all parts excluding the motor 5 from a resin material.

Accordingly, there is a particular advantage in the case where the tube valve 1 is applied to a floating structure such as an airship or the like, for example.

Further, in the tube valve 1, the arrangement of the tube 6 is simple. Namely, because such arrangement can be completed by housing the tube 6 inside the frame 2 without cutting, and then attaching the cover 22, there is an advantage that the tube valve 1 can be provided later for an existing tube 6.

Eighth Embodiment

Next, a tube valve in an eighth embodiment according to the present invention will be described.

Figure 24:
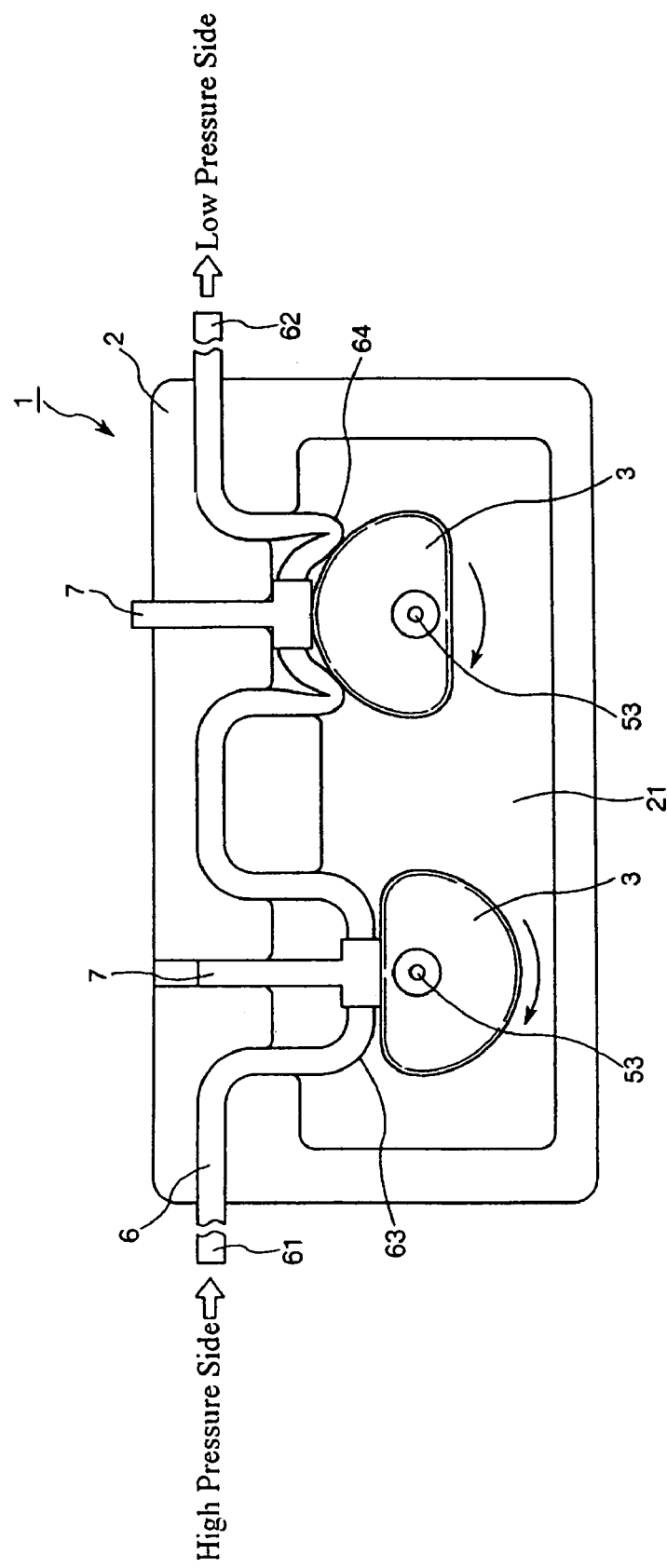
FIG. 24 is a plan view showing a tube valve in an eighth embodiment according to the present invention.

FIG. 24 is a plan view showing a tube valve in an eighth embodiment according to the present invention.

In the description of the tube valve 1 of the eighth embodiment given below, the focus of the description is on the different points between the seventh embodiment described above and the eighth embodiment, and a description of the same parts is omitted.

As shown in FIG. 24, the tube valve 1 of the eighth embodiment includes two (a plurality of) rotors 3. Namely, exclusive rotors 3 are respectively provided at the bending portions 63, 64, and the bend of the bending portions 63, 64 and the restoration (removal) of such bends are carried out by respectively rotating the exclusive rotors 3. In this case, the rotation of each rotor 3 may be controlled individually, or both rotors 3 may be operated together.

According to this tube valve 1, it is possible to obtain the effects similar to those of the seventh embodiment described above.

Ninth Embodiment

Next, a tube valve in a ninth embodiment according to the present invention will be described.

Figure 25:
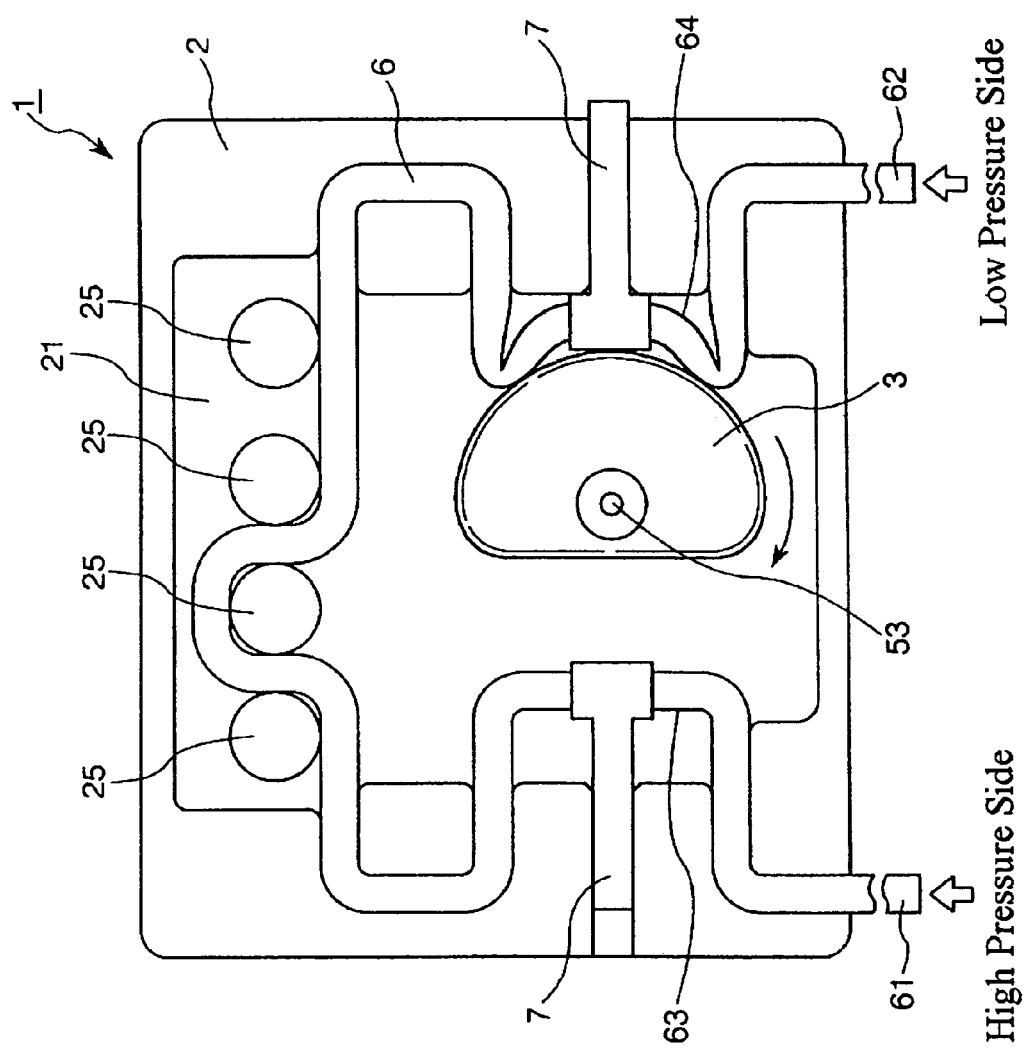
FIG. 25 is a plan view showing a tube valve in a ninth embodiment according to the present invention.

FIG. 25 is a plan view showing a tube valve in a ninth embodiment according to the present invention.

In the description of the tube valve 1 of the ninth embodiment given below, the focus of the description is on the different points between the seventh embodiment described above and the ninth embodiment, and a description of the same parts is omitted.

As shown in FIG. 25, the tube valve 1 of the ninth embodiment has the special feature of being equipped with an adjustment means for adjusting the length of the tube 6 between the bending portions 63, 64. Namely, the tube valve 1 includes a plurality (four in the present embodiment) of columnar hook portions (adjustment means) 25 in the upper portion in FIG. 25 (near the tube 6 between the bending portions 63, 64) inside the concave portion 21 of the frame 2.

In this tube valve 1, the tube 6 is arranged to meander through and be hooked by these hook portions 25, whereby the length of the tube 6 between the bending portions 63, 64 may be adjusted.

In this way, it is possible to freely adjust (change) the amount of fluid that is filled inside the flow path between the bending portions 63, 64 of the tube 6, namely, the flow rate of the fluid discharged to the low pressure side from the high pressure side in one cycle of the rotor 3.

Further, according to this tube valve 1, it is possible to obtain the effects similar to those of the seventh embodiment described above.

Tenth Embodiment

Next, a tube valve in a tenth embodiment according to the present invention will be described.

Figure 26:
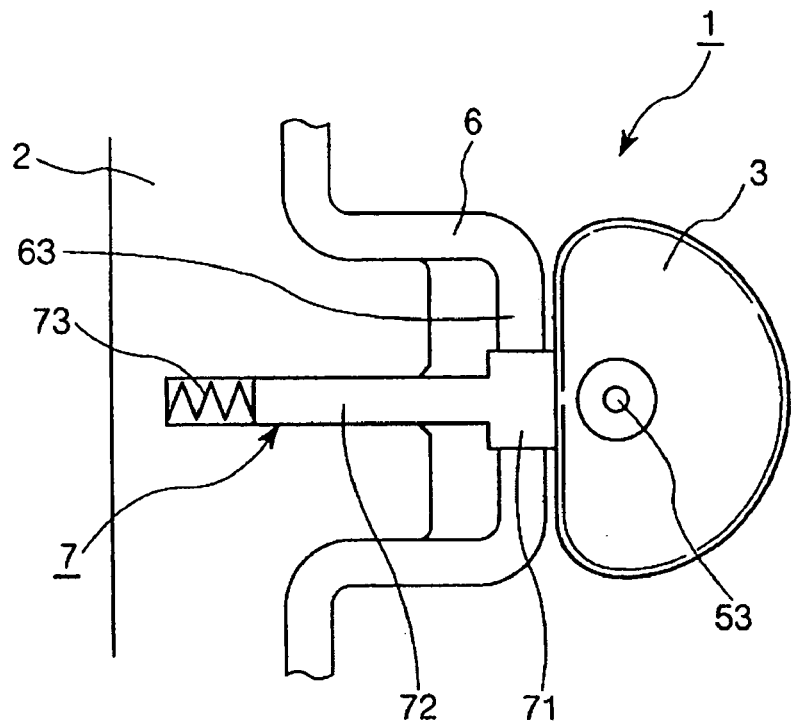
FIG. 26 is a plan view showing a tube valve in a tenth embodiment according to the present invention.

FIG. 26 is a plan view showing a tube valve in a tenth embodiment according to the present invention.

In the description of the tube valve 1 of the tenth embodiment given below, the focus of the description is on the different points between the seventh embodiment described above and the tenth embodiment, and a description of the same parts is omitted.

As shown in FIG. 26, the tube valve 1 of the tenth embodiment has the special feature of including restoration assisting means which assists the restoration of the tube 6. Namely, the tube valve 1 includes a spring (elastic member) 73 provided respectively at the end portion of the sliding portion 72 of each guide 7 as the restoration assisting means. Because the structure and operation of each of these springs 73 are the same, a representative description will be given for the spring 73 at the upstream side bending portion 63 side.

The spring 73 is provided in a slightly constricted state, and biases the guide 7 toward the rotor 3 side (the right side in FIG. 26). In this way, the holding portion 71 of the guide 7 is constantly pressing against (in abutment with) the outer peripheral surface of the rotor 3.

In this tube valve 1, when the guide 7 is pushed by the rotor 3 to bend the tube 6 into a substantial M shape at the upstream side bending portion 63, the spring 73 is further constricted. Then, when the rotor 3 is rotated as shown in FIG. 26, the restoring force of the tube 6 and the restoring force (elastic force) of the spring 73 push the guide 7 to the right side in FIG. 26, whereby the bend of the bending portion 63 is restored (i.e., the fold of the tube 6 is released) and the flow path of the bending portion 63 is opened. In this regard, this is the same for the downstream side bending portion 64.

In this way, the tube valve 1 makes it possible to more reliably restore the tube 6 and open the flow path by means of the operation of the spring 73. For example, even in the case where the rotor 3 is rotated at a high rotation speed and the restoration of the tube 6 cannot follow the rotation of the rotor 3 by just the restoring force of the tube 6 itself, the biasing force of the spring 73 assists the restoring force of the tube 6 and makes it possible for the tube 6 to be restored in a way that follows the rotation of the rotor 3.

Further, according to this tube valve 1, it is possible to obtain the effects similar to those of the seventh embodiment described above.

Eleventh Embodiment

Next, a tube valve in an eleventh embodiment according to the present invention will be described.

Figure 27:
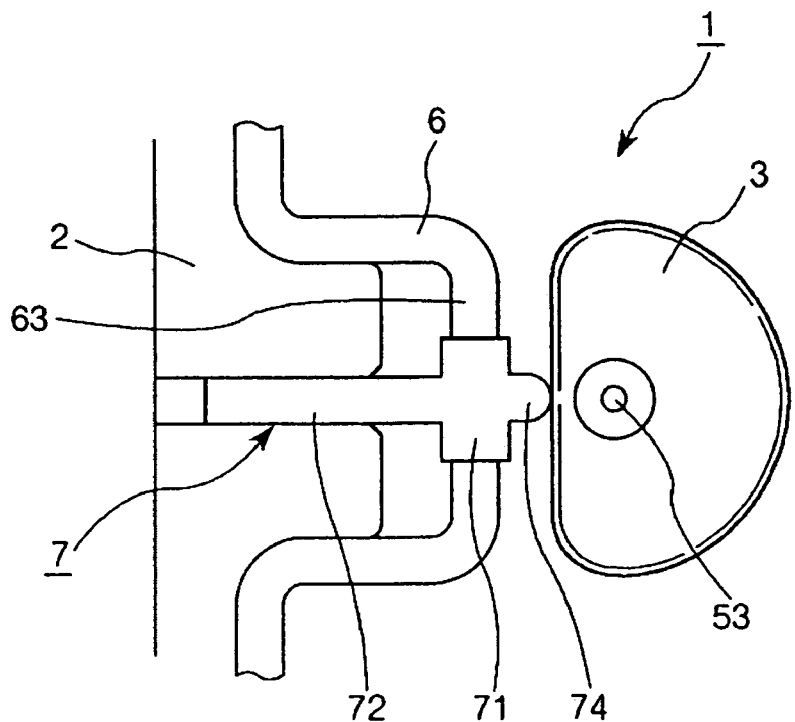
FIG. 27 is a plan view showing a tube valve in an eleventh embodiment according to the present invention.

FIG. 27 is a plan view showing a tube valve in an eleventh embodiment according to the present invention.

In the description of the tube valve 1 of the eleventh embodiment given below, the focus of the description is on the different points between the seventh embodiment described above and the eleventh embodiment, and a description of the same parts is omitted.

As shown in FIG. 27, the tube valve 1 of the eleventh embodiment has the special feature of including a convex portion (contact portion) 74 provided at the rotor 3 side of the holding portion 71 of each guide 7. The convex portion 74 of each guide 7 abuts on (makes contact with) the outer peripheral surface of the rotor 3.

In this way, a space (i.e., clearance) is formed between the tube 6 and the outer peripheral surface of the rotor 3, and this prevents the rotor 3 from touching the tube 6. Accordingly, it is possible to more reliably prevent the tube 6 from being damaged by contact with the rotor 3 when the tube valve 1 is driven.

Further, according to this tube valve 1, it is possible to obtain the effects similar to those of the seventh embodiment described above.

Twelfth Embodiment

Next, a tube valve in a twelfth embodiment according to the present invention will be described.

Figure 28:
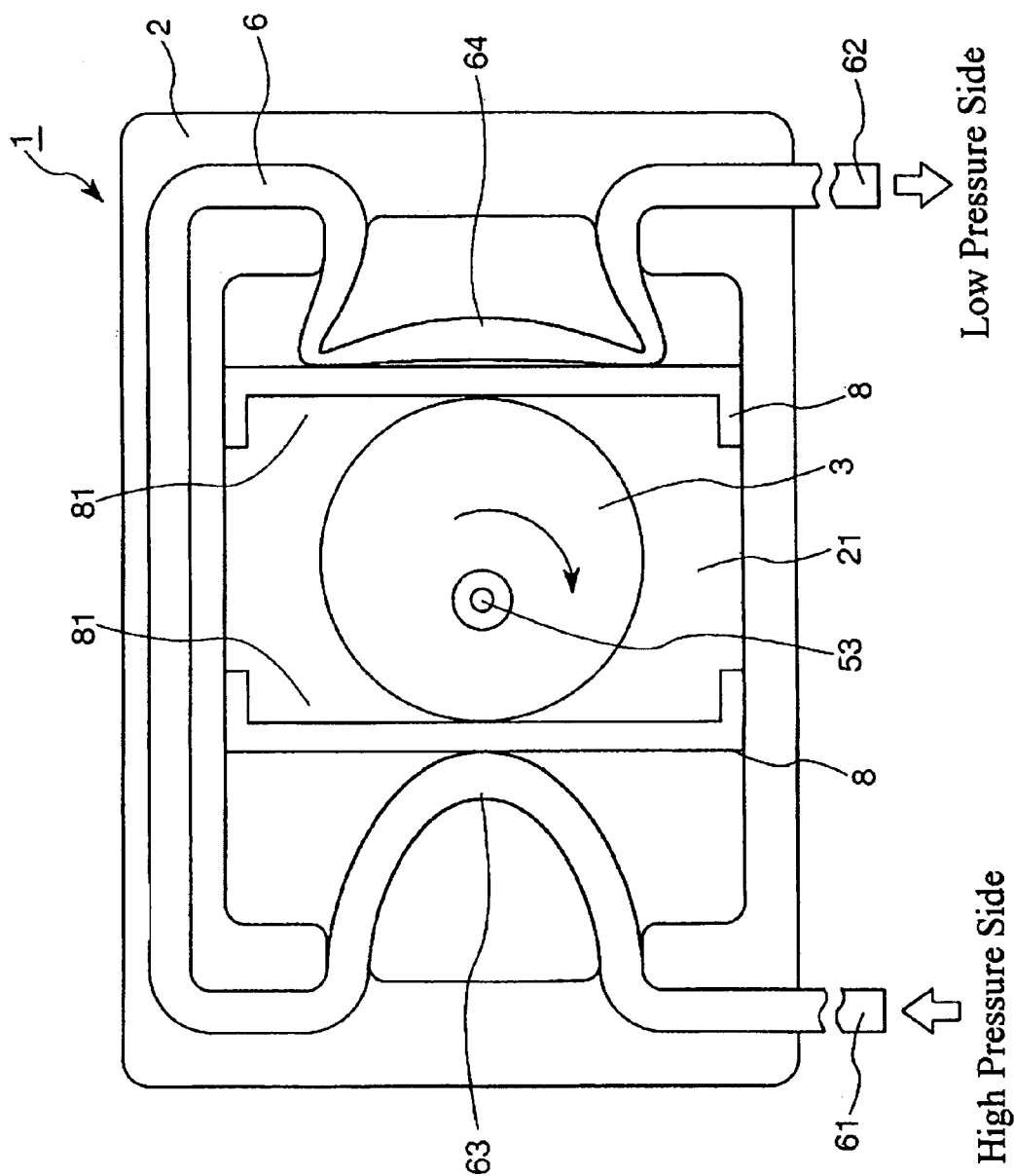
FIG. 28 is a plan view showing a tube valve in a twelfth embodiment according to the present invention.

FIG. 28 is a plan view showing a tube valve in a twelfth embodiment according to the present invention.

In the description of the tube valve 1 of the twelfth embodiment given below, the focus of the description is on the different points between the seventh embodiment described above and the twelfth embodiment, and a description of the same parts is omitted.

As shown in FIG. 28, in the tube valve 1 of the twelfth embodiment, substantial bracket-shaped guides 8 are provided respectively at the sides of the upstream side and downstream side bending portions 63, 64. The guides 8 are arranged so as to be capable of sliding (moving) inside the concave portion 21 of the frame 2, and the openings 81 thereof mutually face each other via the rotor 3.

A portion of the opening 81 of each guide 8 (i.e., the outside surface of the rotor 3 side of each guide 8) makes contact with (touches) the outer peripheral portion (cam portion), namely, the outer peripheral surface (cam surface) of the rotor 3, and the portions opposite to the portions of the rotor 3 side respectively make contact with the neighborhoods of the bending portions 63, 64 of the tube 6.

Accordingly, the portion of the opening 81 of each guide 8 forms a contact portion that makes contact with the outer peripheral portion (cam portion), namely, the outer peripheral surface (cam surface) of the rotor 3, and the portions opposite to the portions of the rotor 3 side form contact portions that respectively make contact with the tube 6 near the bending portions 63, 64.

Further, the rotor 3 is formed to have a substantial circular shape, and the center of rotation (rotation axis) of the rotor 3 is provided at a position shifted away from the center of the circle.

In this tube valve 1, when the rotor 3 is rotated, the guides 8 are respectively pushed by the outer peripheral surface of the rotor 3 and slides inside the frame 2 toward the bending portions 63, 64, and in this way, the bending portions 63, 64 of the tube 6 are pushed in by the guides 8 to be bent and/or folded, whereby the flow path of the fluid is closed. Then, when the rotor 3 is further rotated, the bends (or folds) of the bending portions 63, 64 are restored, whereby the flow path of the fluid is opened.

According to this tube valve 1, it is possible to obtain the effects similar to those of the seventh embodiment described above.

The present invention was described above based on the embodiments shown in the drawings, but the present invention is not limited to those embodiments, and the structure of each component (element) can be replaced by any structure capable of performing the same or a similar function. Further, any other components may be added to the present invention.

Further, the present invention may combine any two or more structures (features) from the embodiments described above.

Further, in the embodiments described above, the main portion of the opening/closing mechanism is formed by the motor 5 and the rotor 3 having a cam portion or the electromagnetic actuator, but the present invention is not limited to this structure, and a crank mechanism or the like may be used in place of the rotor 3, for example.

Further, the present invention may be constructed so that the flow path inside the tube can be opened and closed at three or more places of the tube.

Moreover, there is no particular limitation to the application of the tube valve of the present invention. For example, the tube valve of the present invention can be applied to various devices for controlling a fluid such as a liquid, a gas or the like. As a specific example, the tube valve of the present invention can be utilized as a valve in an apparatus which mixes medical agents, perfumes or the like, for example, in addition to the head cleaning apparatus which cleans the head of the printer described above.

The present application is based on Japanese priority applications No. 2003-134817 filed on May 13, 2003 and No. 2004-004125 filed on Jan. 9, 2004, which are hereby incorporated by reference herein in their entireties.

The invention claimed is:

1. A tube valve comprising:
   a tube defining a flow path therein through which a fluid flows, the tube being arranged so that a part of the tube forms at least one curved portion, the curved portion having a bendable part where the tube can be bent; and
   an opening/closing mechanism which closes the flow path by folding the curved portion of the tube into a substantial M shape by bending the bendable part of the curved portion and opens the flow path by releasing a fold of the curved portion.

2. The tube valve as claimed in claim 1, wherein the opening/closing mechanism comprises a rotating element which is rotatably provided and has a cam portion, and a rotation of the rotating element makes the cam portion thereof operate to bend the bendable part so that the curved portion is folded.

3. The tube valve as claimed in claim 2, further comprising a moving element having a support portion that supports the tube at the bendable part of the curved portion and a contact portion that makes contact with the cam portion of the rotating element;
wherein the rotation of the rotating element makes the cam portion push the contact portion of the moving element to move the moving element, whereby a movement of the moving element makes the bendable part be bent to fold the curved portion.

4. The tube valve as claimed in claim 1, further comprising a guide for controlling a bending direction of the curved portion.

5. The tube valve as claimed in claim 1, wherein the at least one curved portion includes two curved portions, and the opening/closing mechanism opens and/or closes the flow path at the two curved portions of the tube wherein the tube valve is constructed so that the opening/closing operation of the opening/closing mechanism makes the flow path between the two curved portions of the tube be filled with the fluid and then makes the filled fluid be discharged outside the tube valve.

6. The tube valve as claimed in claim 5, wherein the tube valve is provided so that a pressure at one end of the tube is higher than a pressure at the other end of the tube, and wherein the tube valve is constructed so that the opening/closing operation of the opening/closing mechanism makes the flow path between the two curved portions of the tube be filled with the fluid from the one end of the tube and then makes the filled fluid be discharged outside the tube valve from the other end of the tube.

7. The tube valve as claimed in claim 6, wherein, when the filled fluid is discharged from the flow path between the two curved portions, the tube is folded at any one of the two curved portions by means of the opening/closing mechanism to close the flow path.

8. The tube valve as claimed in claim 7, wherein the one curved portion at which the tube is folded is located on the side of the one end that is under the higher pressure than the other end.

9. The tube valve as claimed in claim 6, wherein, when the flow path between the two curved portions is filled with the fluid, the tube is folded at any one of the two curved portions by means of the opening/closing mechanism to close the flow path.

10. The tube valve as claimed in claim 9, wherein the one curved portion at which the tube is folded is located on the side of the one end that is under the lower pressure than the other end.

11. The tube valve as claimed in claim 5, wherein the opening/closing mechanism always folds the tube at any one of the two curved portions to close the flow path.

12. The tube valve as claimed in claim 5, further comprising adjusting means for adjusting the amount of fluid that is filled in the flow path between the two curved portions by adjusting the length of the tube between the two curved portions.

13. The tube valve as claimed in claim 5, wherein each of the two curved portions has a bendable part where the tube can be bent, and the tube is folded by bending the bendable part.

14. The tube valve as claimed in claim 13, further comprising two guides which respectively control bending directions of the tube at the two curved portions.

15. The tube valve as claimed in claim 14, wherein the two guides respectively include a first moving element which is movably provided and has a support portion that supports the tube at the bendable part of one of the two curved portions and a second moving element which is movably provided and has a support portion that supports the tube at the bendable part of the other curved portion.

16. The tube valve as claimed in claim 14, wherein the two guides respectively include a first moving element which is movably provided and has a contact portion that makes contact with the tube at one of the two curved portions and a second moving element which is movably provided and has a contact portion that makes contact with the tube at the other curved portion.

17. The tube valve as claimed in claim 13, wherein the opening/closing mechanism comprises a rotating element which is rotatably provided and has a cam portion, and the rotation of the rotating element makes the cam portion thereof operate to bend the bendable part so that the tube is folded.

18. The tube valve as claimed in claim 17, further comprising:
a first moving element which is movably provided and has a support portion that supports the tube at the bendable part of one of the two curved portions and a contact portion that makes contact with the cam portion of the rotating element; and
a second moving element which is movably provided and has a support portion that supports the tube at the bendable part of the other curved portion and a contact portion that makes contact with the cam portion of the rotating element;
wherein the rotation of the rotating element makes the cam portion push the contact portion of the first moving element, whereby the movement of the first moving element makes the corresponding bendable part be bent to fold the tube, and wherein the rotation of the rotating element makes the cam portion push the contact portion of the second moving element, whereby the movement of the second moving element makes the corresponding bendable part be bent to fold the tube.

19. The tube valve as claimed in claim 17, further comprising:
a first moving element which is movably provided and has a contact portion that makes contact with the tube at one of the two curved portions and a contact portion that makes contact with the cam portion of the rotating element; and
a second moving element which is movably provided and has a contact portion that makes contact with the tube at the other curved portion and a contact portion that makes contact with the cam portion of the rotating element;
wherein the rotation of the rotating element makes the cam portion push the contact portion of the first moving element, whereby the movement of the first moving element makes the tube be folded, and wherein the rotation of the rotating element makes the cam portion push the contact portion of the second moving element, whereby the movement of the second moving element makes the tube be folded.

20. The tube valve as claimed in claim 1, wherein the tube is restored from a bent state to a released state by a self-restoring force thereof to open the flow path.

21. The tube valve as claimed in claim 20, further comprising restoration assisting means for assisting restoration of the tube.

* * * * *